United States Patent
You et al.

(10) Patent No.: US 11,483,856 B2
(45) Date of Patent: Oct. 25, 2022

(54) METHOD OF TRANSMITTING A TRANSPORT BLOCK AND APPARATUS USING THE SAME

(71) Applicant: LG Electronics Inc., Seoul (KR)

(72) Inventors: Hyangsun You, Seoul (KR); Hyunsoo Ko, Seoul (KR); Suckchel Yang, Seoul (KR); Seunghwan Choi, Seoul (KR); Seonwook Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/576,617

(22) Filed: Jan. 14, 2022

(65) Prior Publication Data

US 2022/0225388 A1    Jul. 14, 2022

(30) Foreign Application Priority Data

| Jan. 14, 2021 | (KR) | 10-2021-0005233 |
| Jan. 14, 2021 | (KR) | 10-2021-0005234 |
| Jan. 15, 2021 | (KR) | 10-2021-0005814 |
| Apr. 6, 2021 | (KR) | 10-2021-0044618 |
| Apr. 6, 2021 | (KR) | 10-2021-0044624 |
| May 11, 2021 | (KR) | 10-2021-0060864 |
| Aug. 6, 2021 | (KR) | 10-2021-0104100 |
| Aug. 6, 2021 | (KR) | 10-2021-0104104 |
| Oct. 1, 2021 | (KR) | 10-2021-0131038 |

(51) Int. Cl.
*H04W 72/12* (2009.01)
*H04W 72/04* (2009.01)

(52) U.S. Cl.
CPC ... *H04W 72/1289* (2013.01); *H04W 72/0446* (2013.01)

(58) Field of Classification Search
CPC .......... H04W 72/1289; H04W 72/0446
See application file for complete search history.

(56) References Cited

U.S. PATENT DOCUMENTS

| 2020/0162208 A1* | 5/2020 | Moon | H04W 72/042 |
| 2020/0351934 A1 | 11/2020 | Khoshnevisan et al. | |
| 2022/0116967 A1* | 4/2022 | Yeo | H04W 72/1268 |

FOREIGN PATENT DOCUMENTS

| EP | 3905819 A1 * | 11/2021 | H04L 1/0003 |
| KR | 20220050720 A * | 4/2022 | H04L 25/0224 |
| WO | WO-2020165835 A1 * | 8/2020 | H04L 5/0044 |

OTHER PUBLICATIONS

InterDigital Inc., "PUSCH coverage enhancements," 3GPP TSG RAN WG1 #103-e, RI-2009168, e-Meeting, Oct. 26-Nov. 13, 2020, 16 pages.

(Continued)

*Primary Examiner* — Melvin C Marcelo
(74) *Attorney, Agent, or Firm* — Fish & Richardson P.C.

(57) ABSTRACT

Provided are a method and apparatus for determining a transport block size (TBS) when transmitting a transport block through a PUSCH by applying transport block processing over multiple slots (TBoMS) in a wireless communication system. The UE determines the TBS based on the number of resource elements ($N_{RE}$) allocated for the PUSCH, in this case, considers the number of slots for the TBoMS.

15 Claims, 31 Drawing Sheets

Determining a transport block size (TBS) of a transport block based on the number of resource elements (REs) allocated for the first PUSCH ($N_{RE}$), the $N_{RE}$ being a value obtained by multiplying all of i) the number of the plurality of slots (Z), ii) a smaller one between a predetermined fixed value (e.g., 156) and the number of resource elements allocated for PUSCH within a physical resource block ($N'_{RE}$) (i.e., min(156, $N'_{RE}$)) and iii) the number of allocated physical resource blocks for the UE ($n_{PRB}$) (i.e., $N_{RE} = Z \cdot \min(156, N'_{RE}) \cdot n_{PRB}$) — S231

Transmitting the transport block having the TBS through a plurality of slots for the first PUSCH — S232

(56) References Cited

OTHER PUBLICATIONS

LG Electronics, "Discussions on PUSCH coverage enhancement," 3GPP TSG RAN WG1 #103-e, R1-2008403, e-Meeting, Oct. 26-Nov. 13, 2020, 7 pages.

PCT International Search Report and Written Opinion in International Application No. PCT/KR2022/000741, dated May 2, 2022, 6 pages (with English translation).

Sierra Wireless, "Potential techniques for NR coverage enhancements," 3GPP TSG RAN WG1 #103-e, R1-2007930, e-Meeting, Oct. 26-Nov. 13, 2020, 11 pages.

Vivo, "Discussion on solutions for PUSCH coverage enhancement," 3GPP TSG RAN WG1 #103-e, R1-2007680, e-Meeting, Oct. 26-Nov. 13, 2020, 9 pages.

\* cited by examiner

PUSCH repetition type A

FIG. 10
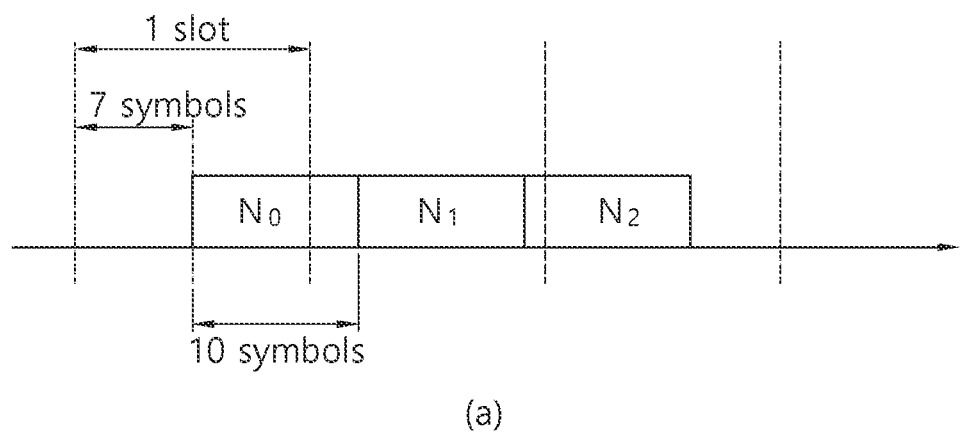
(a)
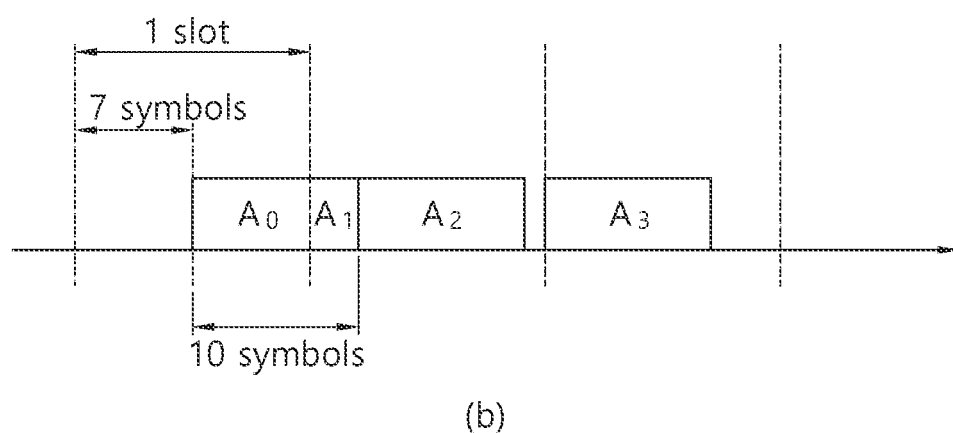
(b)

Determining a transport block size (TBS) of a transport block based on the number of resource elements (REs) allocated for the first PUSCH ($N_{RE}$), the $N_{RE}$ being a value obtained by multiplying all of i) the number of the plurality of slots (Z), ii) a smaller one between a predetermined fixed value (e.g., 156) and the number of resource elements allocated for PUSCH within a physical resource block ($N'_{RE}$) (i.e., $\min(156, N'_{RE})$) and iii) the number of allocated physical resource blocks for the UE ($n_{PRB}$) (i.e., $N_{RE} = Z \cdot \min(156, N'_{RE}) \cdot n_{PRB}$) — S231

Transmitting the transport block having the TBS through a plurality of slots for the first PUSCH — S232

METHOD OF TRANSMITTING A TRANSPORT BLOCK AND APPARATUS USING THE SAME

CROSS-REFERENCE TO RELATED APPLICATIONS

Pursuant to 35 U.S.C. § 119 (a), this application claims the benefit of Korean Applications No. 10-2021-0005233, filed on Jan. 14, 2021, No. 10-2021-0005234, filed on Jan. 14, 2021, No. 10-2021-0005814, filed on Jan. 15, 2021, No. 10-2021-0044624, filed on Apr. 6, 2021, No. 10-2021-0044618, filed on Apr. 6, 2021, No. 10-2021-0060864, filed on May 11, 2021, No. 10-2021-0104104, filed on Aug. 6, 2021, No. 10-2021-0104100, filed on Aug. 6, 2021, and No. 10-2021-0131038, filed on Oct. 1, 2021, the contents of which are all hereby incorporated by reference herein in their entirety.

BACKGROUNDS

Field of the Description

The present disclosure relates to a method for transmitting a transport block in a wireless communication system and an apparatus using the method.

Related Art

As a growing number of communication devices require higher communication capacity, there is a need for advanced mobile broadband communication as compared to existing radio access technology (RAT). Massive machine-type communication (MTC), which provides a variety of services any time and anywhere by connecting a plurality of devices and a plurality of objects, is also one major issue to be considered in next-generation communication. In addition, designs for communication systems considering services or a user equipment (UE) sensitive to reliability and latency are under discussion. Introduction of next-generation RAT considering enhanced mobile broadband communication, massive MTC, and ultra-reliable and low-latency communication (URLLC) is under discussion. In this disclosure, for convenience of description, this technology may be referred to as new RAT or new radio (NR). NR is also referred to as a fifth generation (5G) system.

In the existing wireless communication system, a transport block (TB) is mapped to one transmission time interval (TTI, for example, a slot) and transmitted. However, in a future wireless communication system such as NR, a transport block may be mapped to a plurality of TTIs (slots) and transmitted. This is called TB processing over multi-slot (TBoMS). TBoMS may be applied to physical uplink shared channel (PUSCH) transmission, and a PUSCH to which TBoMS is applied may be referred to as a TBoMS PUSCH. Repeated transmission may be applied to the TBoMS PUSCH transmission.

Since the above-described TBoMS is not considered in the existing standard, it is difficult to apply the existing standard to TBoMS PUSCH transmission or repeated TBoMS PUSCH transmission. For example, the existing standard does not disclose how to signal the number of slots to which transport blocks are mapped in TBoMS PUSCH transmission/repeated transmission, how to determine the size of the transport block, how to map the transport block to the plurality of slots. Therefore, it is necessary to clearly define this.

SUMMARY

A technical object of the disclosure is to provide a method and an apparatus for transmitting a transport block in a wireless communication system.

The present specification provides a method for transmitting a transport block of an apparatus, a method for receiving a transport block, and apparatuses using the method. Specifically, an apparatus (e.g., a terminal) determines a transport block size (TBS) of a transport block, and transmits the transport block having the TBS through a plurality of slots for a first PUSCH. Here, the TBS is determined based on the number of resource elements (REs) allocated for the first PUSCH ($N_{RE}$), the $N_{RE}$ is a value obtained by multiplying all of i) a number of the plurality of slots (Z), ii) a smaller one between a predetermined fixed value and a number of resource elements allocated for PUSCH within a physical resource block ($N'_{RE}$) and iii) a number of allocated physical resource blocks for the UE ($n_{PRB}$).

The apparatus includes a transceiver for transmitting and receiving radio signals and a processor operative in combination with the transceiver. The processor performs the transport block transmission method described above.

A chipset in the apparatus includes a processor and a memory coupled to the processor and storing instructions to be executed by the processor. The processor performs the transport block transmission method described above.

The above-described transport block transmission method may be performed by instructions in a computer readable medium (CRM).

In terms of a base station, a method for receiving a transport block is provided. The method includes transmitting downlink control information (DCI) for scheduling a first physical uplink shared channel (PUSCH) to a user equipment (UE) and receiving the transport block having a specific transport block size (TBS) from the UE through a plurality of slots for the first PUSCH. Here, the TBS is determined based on a number of resource elements (REs) allocated for the first PUSCH ($N_{RE}$). The $N_{RE}$ is a value obtained by multiplying all of i) a number of the plurality of slots (Z), ii) a smaller one between a predetermined fixed value and a number of resource elements allocated for PUSCH within a physical resource block ($N'_{RE}$) and iii) a number of allocated physical resource blocks for the UE ($n_{PRB}$). A time domain resource assignment (TDRA) field included in the DCI informs of a specific row of a resource allocation table, and the specific row contains information for the number of the plurality of slots (Z).

The base station includes a transceiver for transmitting and receiving radio signals and a processor operating in combination with the transceiver, and the method for receiving the transport block may be performed by the processor.

When TBoMS PUSCH transmission/repeated transmission is applied in a future wireless communication system, by providing how to signal the number of slots to which a transport block is mapped, how to determine the size of a transport block, and how to map a transport block to a plurality of slots, clear operation is possible without misunderstanding between the network and the terminal. In addition, during TBoMS PUSCH transmission/repeated transmission, a coding gain can be obtained by applying a sufficient TB size, and media access control (MAC) header overhead can be reduced. In addition, additional signaling overhead for signaling the number of slots to which transport blocks are mapped can be minimized.

BRIEF DESCRIPTION OF THE DRAWINGS

FIG. 10 illustrates PUSCH repetition type B.

FIG. 17 illustrates an RV index applied to each TB transmission occasion.

FIG. 23 illustrates a transport block (TB) transmission method of a user equipment according to an embodiment of the present disclosure.

DESCRIPTION OF EXEMPLARY EMBODIMENTS

Figure 1:
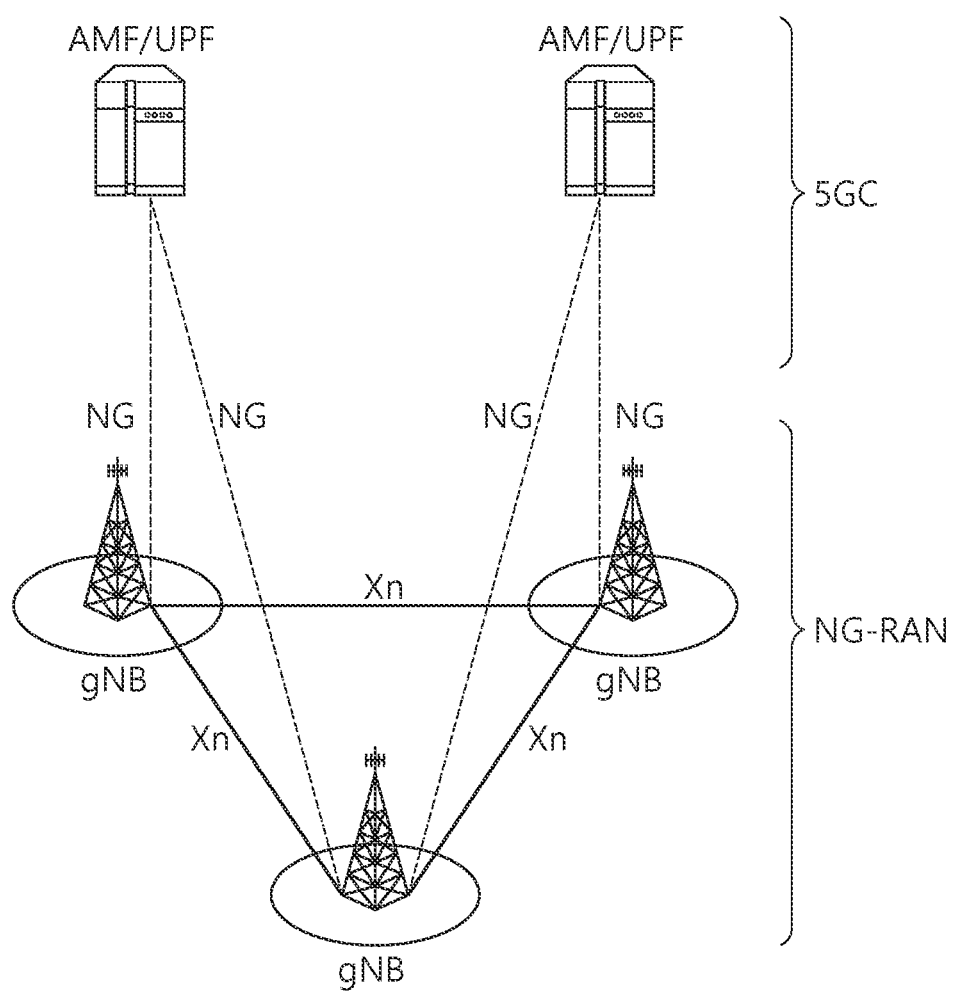
FIG. 1 illustrates a system structure of a New Generation Radio Access Network (NG-RAN) to which NR is applied.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

A wireless communication system to which the present disclosure may be referred to as an Evolved-UMTS Terrestrial Radio Access Network (E-UTRAN) or a Long Term Evolution (LTE)/LTE-A system, for example.

The E-UTRAN includes at least one base station (BS) which provides a control plane and a user plane to a user equipment (UE). The UE may be fixed or mobile, and may be referred to as another terminology, such as a mobile station (MS), a user terminal (UT), a subscriber station (SS), a mobile terminal (MT), a wireless device, terminal, etc. The BS is generally a fixed station that communicates with the UE and may be referred to as another terminology, such as an evolved node-B (eNB), a base transceiver system (BTS), an access point, gNB, etc.

The BSs are interconnected by means of an X2 interface. The BSs are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/ latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

FIG. 1 illustrates a system structure of a next generation radio access network (NG-RAN) to which NR is applied.

Referring to FIG. 1, the NG-RAN may include a gNB and/or an eNB that provides user plane and control plane protocol termination to a UE. FIG. 1 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
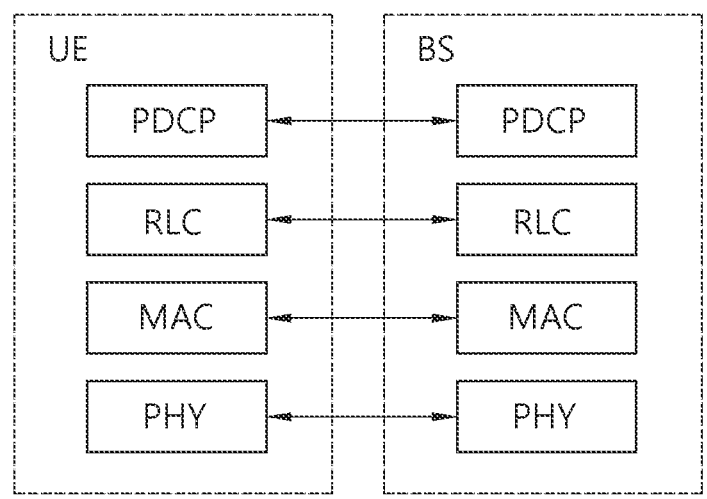
FIG. 2 is a diagram showing a wireless protocol architecture for a user plane.
Figure 3:
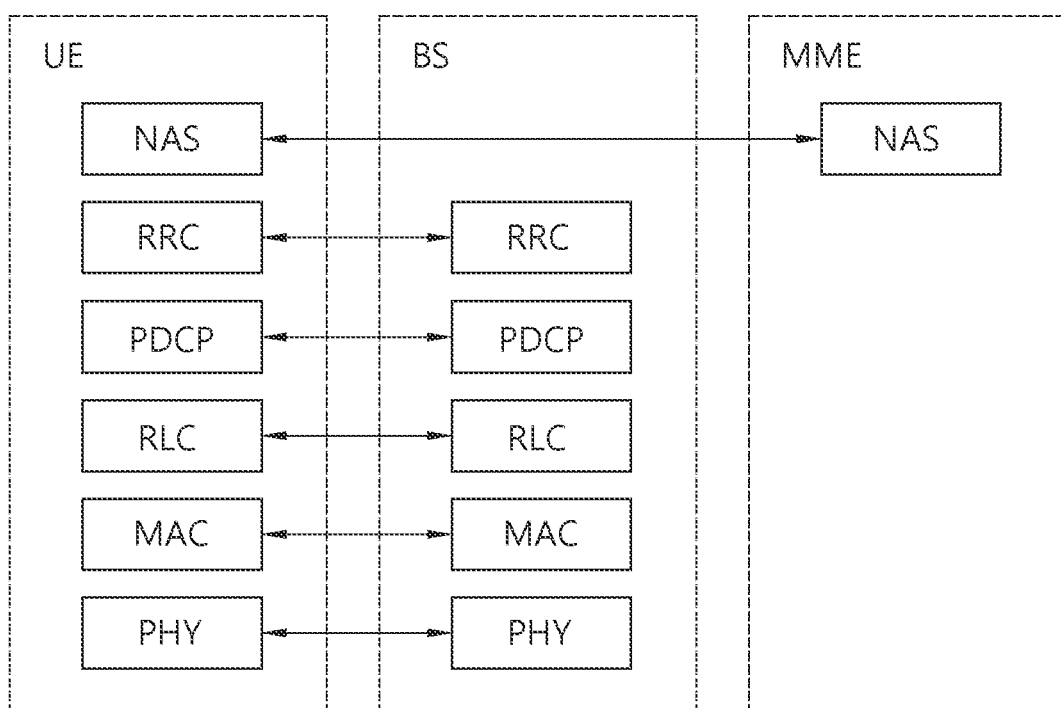
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission such as a slot/subframe.

Figure 4:
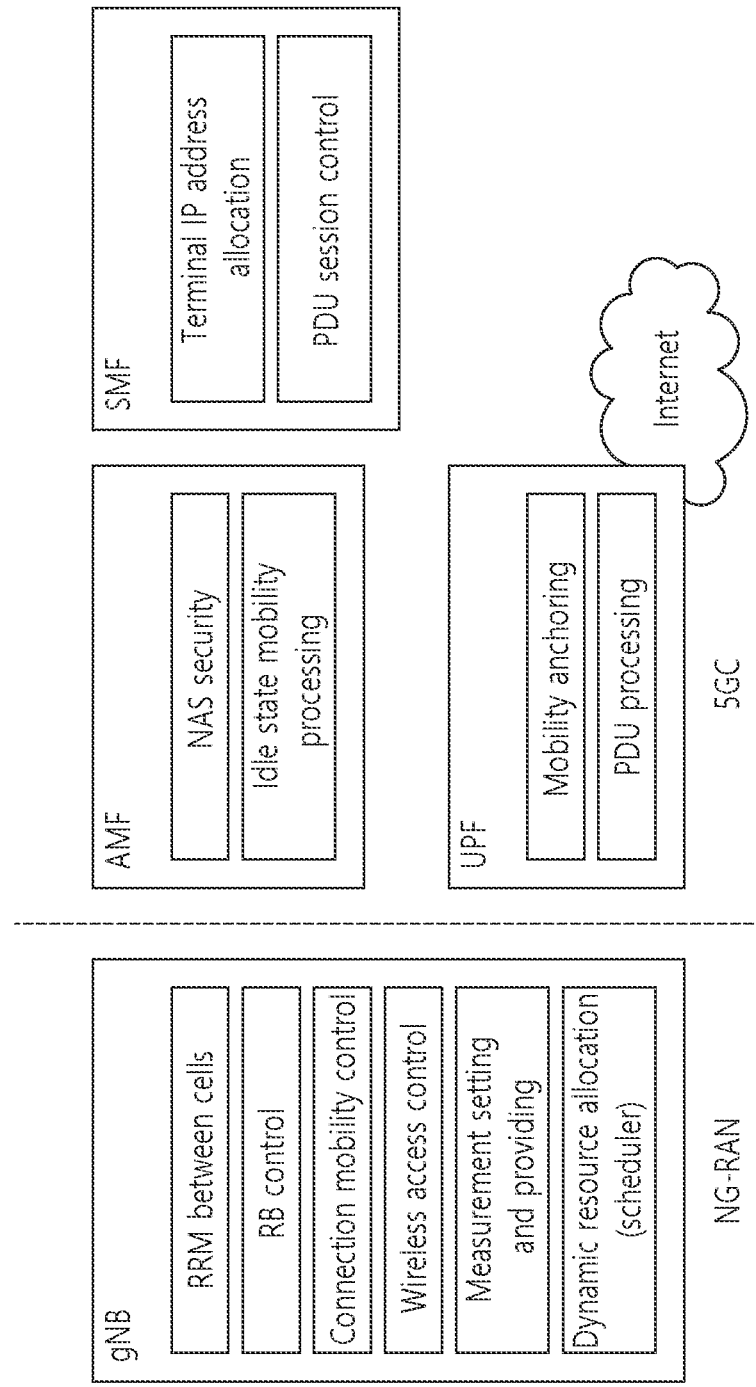
FIG. 4 illustrates a functional division between an NG-RAN and a 5GC.

FIG. 4 illustrates a functional division between an NG-RAN and a 5GC.

Referring to FIG. 4, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 5:
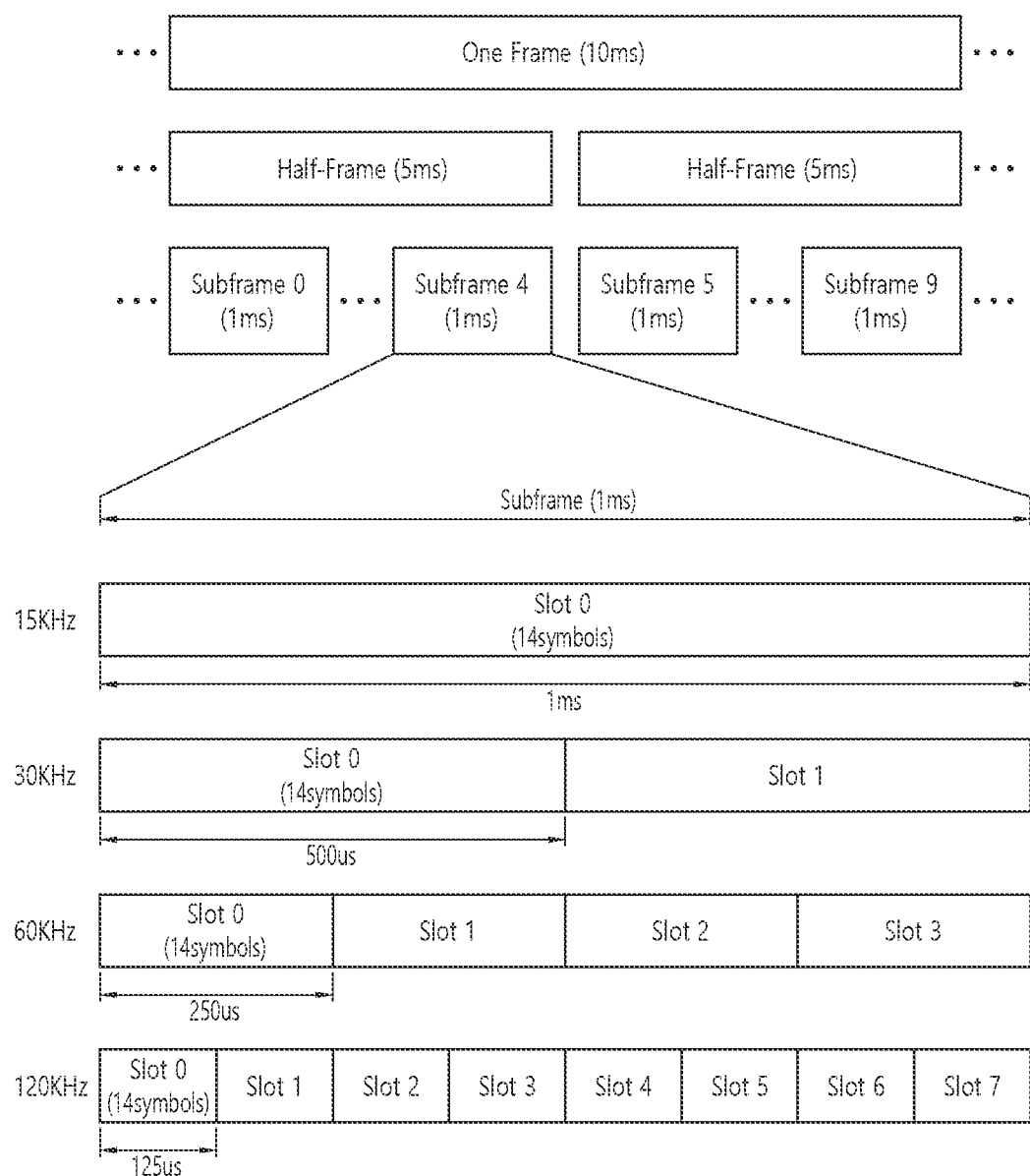
FIG. 5 illustrates an example of a frame structure that may be applied in NR.

FIG. 5 illustrates an example of a frame structure that may be applied in NR.

Referring to FIG. 5, a radio frame (which may be called as a frame hereinafter) may be used for uplink and downlink transmission in NR. A frame has a length of 10 ms and may be defined as two 5 ms half-frames (Half-Frame, HF). A half-frame may be defined as five 1 ms subframes (Sub-frame, SF). A subframe may be divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or a CP-OFDM symbol) and an SC-FDMA symbol (or a DFT-s-OFDM symbol).

The following table 1 illustrates a subcarrier spacing configuration p.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations p.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 6:
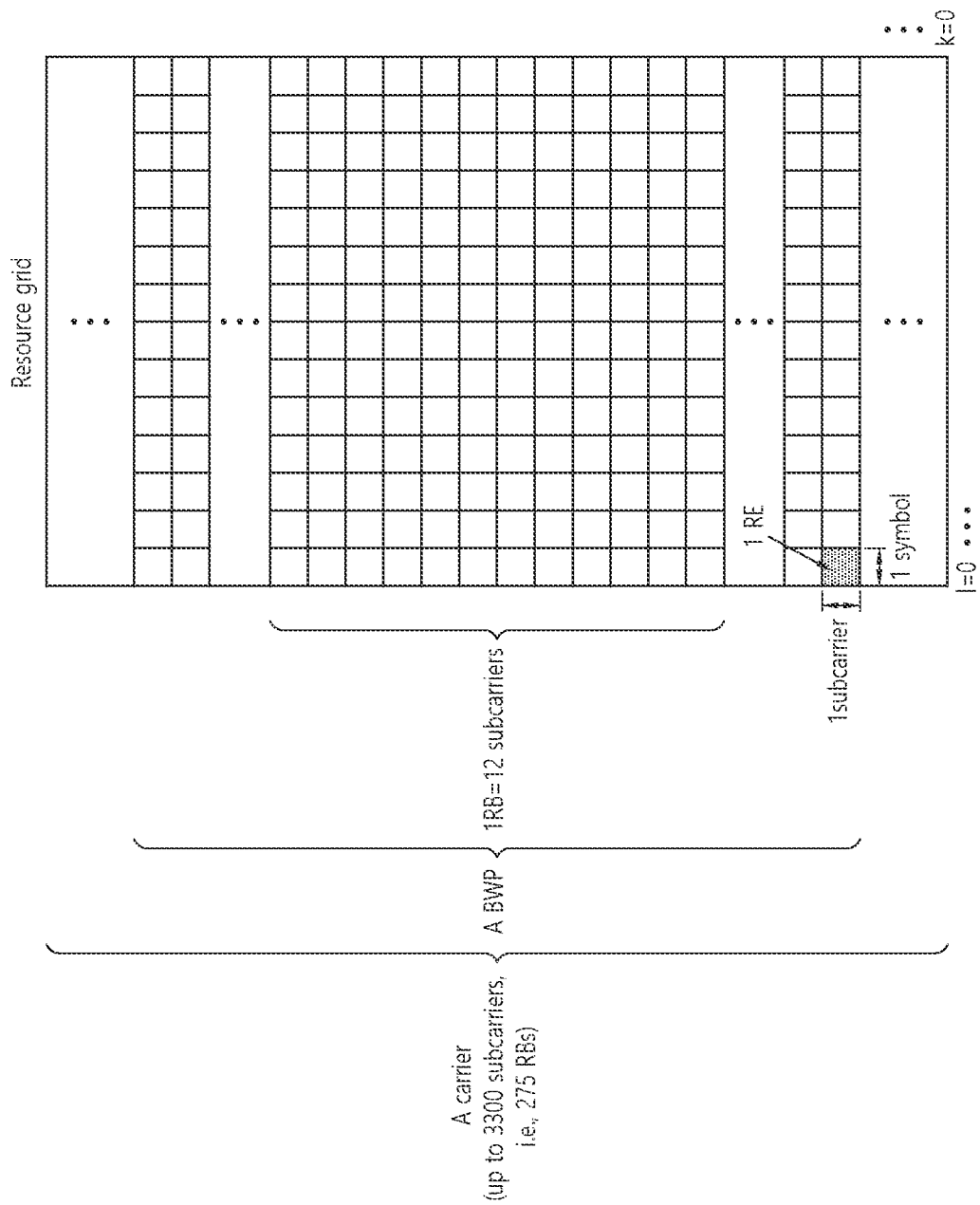
FIG. 6 illustrates a slot structure of the NR frame.

In FIG. 6, μ=0, 1, 2, and 3 are exemplified.

Table 2-1 below exemplifies that the number of symbols per slot, the number of slots per frame, and the number of slots per subframe vary according to SCS (μ=2, 60 KHz) when the extended CP is used.

TABLE 2-1

| μ | $N^{slot}_{symb}$ | $N^{frame,\mu}_{slot}$ | $N^{subframe,\mu}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

FIG. 6 illustrates a slot structure of a NR frame.

A slot may comprise a plurality of symbols in a time domain. For example, in case of a normal CP, one slot may include 14 symbols. However, in case of an extended CP, one slot may include 12 symbols. The carrier may include a plurality of subcarriers in a frequency domain. A resource block (RB) may be defined as a plurality of consecutive subcarriers (e.g., 12) in the frequency domain. A bandwidth part (BWP) may be defined as a plurality of consecutive (P)RBs in the frequency domain, and may correspond to one numerology (e.g., SCS, CP length, etc.). A carrier may include a maximum of N (e.g., 5) BWPs. Data communication is performed through the activated BWP, and only one BWP can be activated for one UE. Each element in the resource grid is referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring means decoding each PDCCH candidate according to a downlink control information (DCI) format. The UE monitors a set of PDCCH candidates in one or more CORESETs (described below) on the activated DL BWP of each activated serving cell for which PDCCH monitoring is configured according to a corresponding search space set.

A new unit called a control resource set (CORESET) may be introduced in the NR. The UE may receive a PDCCH in the CORESET.

The CORESET includes $N^{CORESET}_{RB}$ resource blocks in the frequency domain, and $N^{CORESET}_{symb} \in (1, 2, 3)$ number of symbols in the time domain. $N^{CORESET}_{RB}$ and $N^{CORESET}_{symb}$ may be provided by a base station via higher layer signaling. A plurality of CCEs (or REGs) may be included in the CORESET. One CCE may be composed of a plurality of resource element groups (REGs), and one REG may include one OFDM symbol in the time domain and 12 resource elements in the frequency domain.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

A control region in the conventional wireless communication system (e.g., LTE/LTE-A) is configured over the entire system band used by a base station (BS). All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, CORESET described above was introduced. CORESETs are radio resources for control information to be received by the UE and may use only a portion, rather than the entirety of the system bandwidth in the frequency domain. In addition, in the time domain, only some of the symbols in the slot may be used. The BS may allocate the CORESET to each UE and may transmit control information through the allocated CORESET.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.
<Self-Contained Subframe Structure>

In NR, a structure in which a control channel and a data channel are time-division-multiplexed within one TTI, as shown in FIG. 10, can be considered as a frame structure in order to minimize latency.

DL transmission and UL transmission are sequentially performed within one subframe and thus DL data can be transmitted and UL ACK/NACK (Acknowledgement/negative-acknowledgement) can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 7:
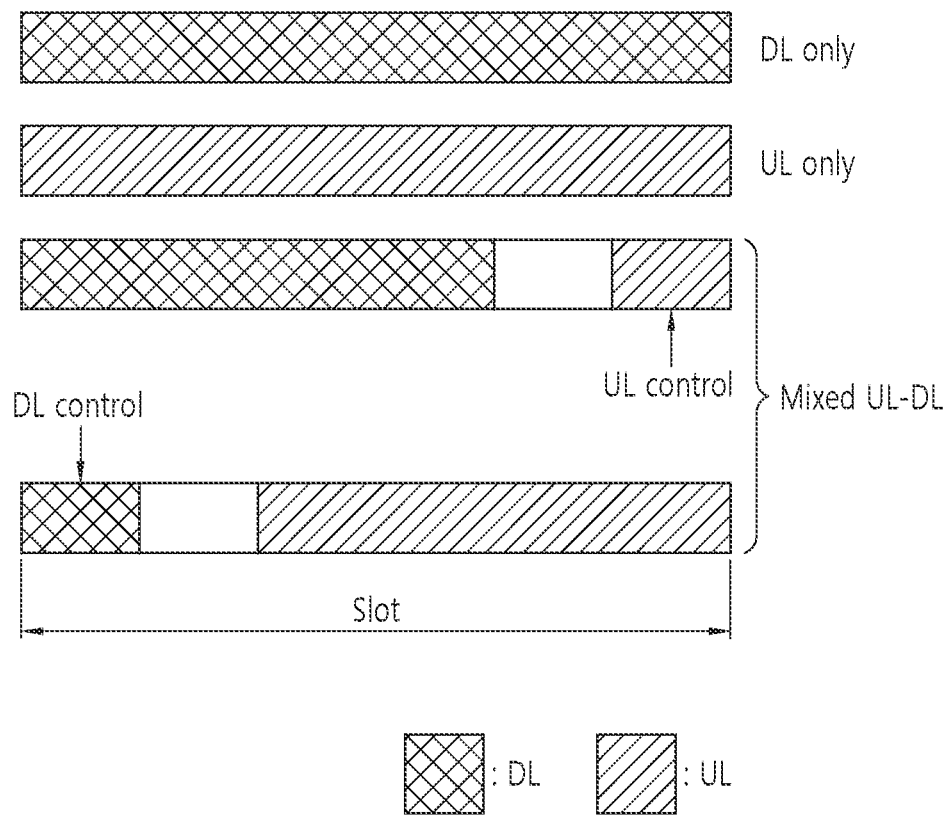
FIG. 7 illustrates a structure of self-contained slot.

FIG. 7 illustrates a structure of self-contained slot.

In NR system, one slot includes all of a DL control channel, DL or UL data channel, UL control channel, and so on. For example, the first N symbols in a slot may be used for transmitting a DL control channel (in what follows, DL control region), and the last M symbols in the slot may be used for transmitting an UL control channel (in what follows, UL control region). N and M are each an integer of 0 or larger. A resource region located between the DL and UL control regions (in what follows, a data region) may be used for transmission of DL data or UL data. As one example, one slot may correspond to one of the following configurations. Each period is listed in the time order.

1. DL only configuration
2. UL only configuration
3. Mixed UL-DL configuration
DL region+GP (Guard Period)+UL control region
DL control region+GP+UL region
a DL region: (i) a DL data region, (ii) DL control region plus DL data region
a UL region: (i) an UL data region, (ii) UL data region plus UL control region.

In the DL control region, a PDCCH may be transmitted, and in the DL data region, a PDSCH may be transmitted. In the UL control region, a PUCCH may be transmitted, and in the UL data region, a PUSCH may be transmitted. In the PDCCH, Downlink Control Information (DCI), for example, DL data scheduling information or UL data scheduling information may be transmitted. In the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A GP provides a time gap during a process where a gNB and a UE transition from the transmission mode to the reception mode or a process where the gNB and UE transition from the reception mode to the transmission mode. Part of symbols belonging to the occasion in which the mode is changed from DL to UL within a subframe may be configured as the GP.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a primary synchronization signal (PSS), secondary synchronization signal (SSS), and a PBCH associated with demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

Figure 8:
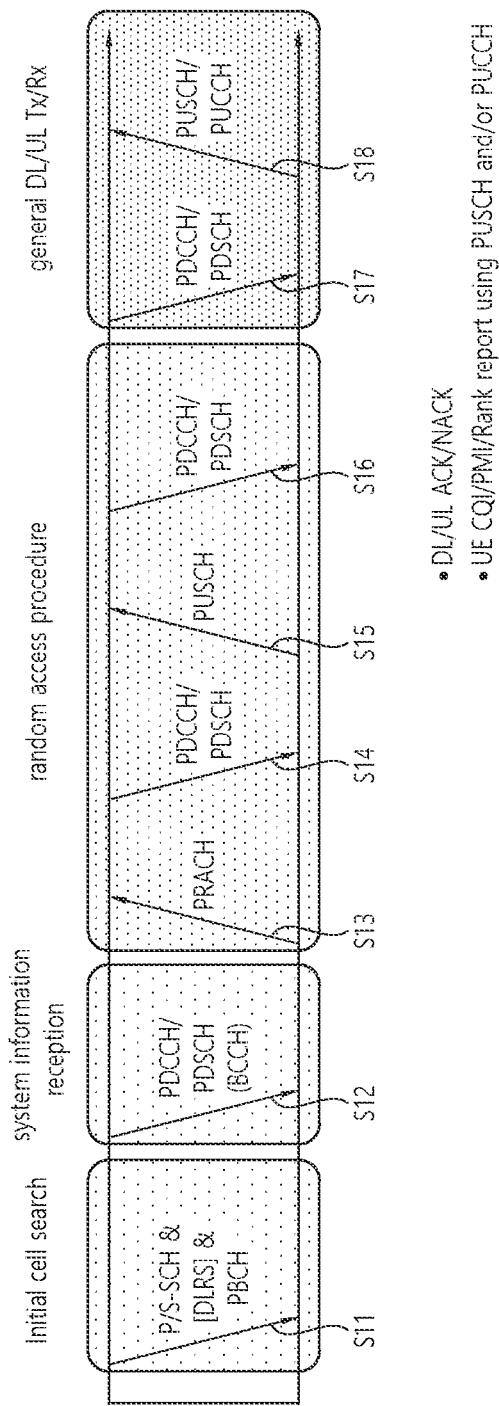
FIG. 8 illustrates physical channels and general signal transmission.

FIG. 8 illustrates physical channels and typical signal transmission.

Referring to FIG. 8, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

The present disclosure will now be described.

Because coverage directly affects service quality and cost (e.g., CAPEX (Capital Expenses) and OPEX (Operating Expenses)), it is one of the key factors that telecommunication companies consider when commercializing cellular networks. Many countries are making more spectrum available in FR1, such as 3.5 GHz, which is usually a higher frequency than LTE or 3G.

NR is designed to operate at much higher frequencies such as 28 GHz or 39 GHz in FR2 compared to LTE. Higher frequencies inevitably cause radio channels to experience higher path loss, making it more difficult to maintain the same quality of service as legacy RATs.

An important mobile application is a voice service that expects ubiquitous coverage at all times, no matter where the general subscriber is.

In evaluating baseline performance, the following channels may be potential bottlenecks for FR1.

In the first order, PUSCH for eMBB (for FDD and TDD with DDDSU, DDDSUDDSUU and DDDDDDDSUU), PUSCH for VoIP (for FDD and TDD with DDDSU, DDDSUDDSUU).

In the second order, PRACH format B4, PUSCH of message 3, PUCCH format 1, PUCCH format 3 of 11 bits, PUCCH format 3 of 22 bits, broadcast PDCCH.

The next channel could be a potential bottleneck for the city's 28 GHz scenario. PUSCH for eMBB (DDDSU and DDSU), PUSCH for VoIP (DDDSU and DDSU), PUCCH format 3 of 11 bits, PUCCH format 3 of 22 bits, PRACH format B4, and PUSCH of message 3.

For PUSCH enhancement, the following may be discussed.

For enhancement to PUSCH repetition type A, 1) the maximum number of repetitions can be increased to a number determined in the course of work, or 2) the number of repetitions calculated based on available uplink slots may be used.

In order to support TB processing through the multi-slot PUSCH, the TBS may be determined based on the multi-slot and transmitted through the multi-slot.

To enable joint channel estimation, a mechanism that enables joint channel estimation for multiple PUSCH transmissions may be specified based on conditions for maintaining power consistency and phase continuity.

Inter-slot frequency hopping using inter-slot bundling that enables joint channel estimation may be considered.

To improve PUCCH, the following mechanisms may be considered. 1) a signaling mechanism to support dynamic PUCCH repetition factor indication, 2) a mechanism supporting DM-RS (demodulation-reference signal: DMRS) bundling over PUCCH repetitions, 3) a mechanism to support PUSCH repetition type A for message 3.

Based on such discussions, in this disclosure, when performing TB processing over multi-slot PUSCH (TBoMS) operation over multiple slots for coverage enhancement of the UE, a slot resource to which one TB is mapped is proposed.

PUSCH repetition type A and type B are introduced in NR Rel-15/16, and transmission is performed as follows according to the PUSCH repetition type.

1. PUSCH Repetition Type A

Figure 9:
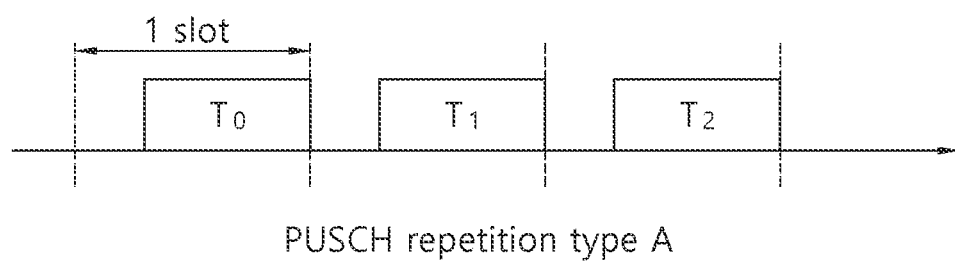
FIG. 9 illustrates PUSCH repetition type A.

FIG. 9 illustrates PUSCH repetition type A.

Referring to FIG. 9, PUSCH repetition type A is a slot based repetition. As shown in FIG. 9, repetition is performed with the same PUSCH transmission start symbol position and PUSCH transmission symbol length (meaning the number of symbols transmitting PUSCH) for each slot. At this time, if there is an invalid symbol that cannot be used for PUSCH transmission among symbol resources constituting a specific PUSCH repetition, the transmission of the corresponding PUSCH repetition is dropped and not performed. That is, when a total of 4 repeated PUSCH transmissions of Rep0, Rep1, Rep2, and Rep3 are performed, when an invalid symbol is included in the symbol resource constituting Rep1, the transmission of Rep1 is dropped, and only transmissions of Rep0, Rep2, and Rep3 are performed. Accordingly, the number of repetitions actually performed may be smaller than the configured number of repetitions.

For PUSCH repetition type A, frequency hopping may be configured for the UE according to a higher layer parameter. One of the following two frequency hopping modes can be configured. 1) Intra-slot frequency hopping, applicable to single slot and multi-slot PUSCH transmission, 2) Inter-slot frequency hopping, applicable to multi-slot PUSCH transmission.

2. PUSCH Repetition Type B

FIG. 10 illustrates PUSCH repetition type B.

Referring to FIG. 10, in PUSCH repetition type B, repetition is performed in units of a symbol length in which an actual PUSCH is transmitted. When the PUSCH is transmitted in 10 symbols as in (a) of FIG. 10, PUSCH repetition is performed in units of 10 consecutive symbols. Nominal repetition is repetition of determining PUSCH repeated transmission time resources without considering slot boundaries, invalid symbols, and the like. However, in the case of actual PUSCH repetition, one PUSCH cannot be transmitted at the slot boundary.

When the PUSCH transmission includes a slot boundary, two actual repetitions are performed based on the slot boundary as shown in (b) of FIG. 10. In addition, one PUSCH transmission may be performed only through consecutive symbols. If there is an invalid symbol in the time resource for which PUSCH repetition is to be transmitted, the actual repetition is constructed using consecutive symbols bounded by an invalid symbol. For example, if symbols #0~#9 constitute one nominal repetition and symbols #3~#5 are invalid symbols, symbols #0~#2 and symbols #6~#9, excluding the invalid symbols, each constitute one actual repetition.

When a symbol that cannot be used for PUSCH transmission (e.g., a symbol indicated as a downlink symbol by DCI format 2_0) is included in one actual repetition resource, the UE drops and does not perform the actual repeated transmission.

When PUSCH repetition type A is applied in NR, the PUSCH transmission slot resource and TB mapping process are as follows.

For PUSCH repetition type A, when transmitting a PUSCH scheduled by DCI format 0_1 or 0_2 having a CRC scrambled to C-RNTI, MCS-C-RNTI, or CS-RNTI with NDI=1 in a PDCCH, the number of repetitions K may be determined as follows.

1) If 'numberofrepetitions' is in the resource allocation table, the number of repetitions K is equal to 'numberofrepetitions'.

2) Else if the UE is configured with 'pusch-AggregationFactor', the number of repetitions K is the same as 'pusch-AggregationFactor'.

3) Otherwise, K=1.

For PUSCH repetition type A, if K>1, the same symbol allocation is applied over K consecutive slots. And PUSCH is limited to a single transport layer.

The UE repeats the TB over K consecutive slots applying the same symbol allocation in each slot. A redundancy version (RV) to be applied to the n (n=0, 1, ... K−1) th transmission occasion of the TB may be determined according to Table 4 below.

| $rv_{id}$ indicated by the DCI scheduling the PUSCH | $rv_{id}$ to be applied to $n^{th}$ transmission occasion (Repetition type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In the case of PUSCH repetition type A, if a specific condition is satisfied, PUSCH transmission may be omitted in one slot of multi-slot PUSCH transmission.

A transport block (TB) of PUSCH is mapped and transmitted through symbol resources in one slot. When PUSCH repetition is performed K times by applying PUSCH repetition type A, the TB is repeatedly transmitted K times using K consecutive slots. In this case, the RV (redundancy version) value is determined as shown in Table 4 according to the order of the TB transmission occasion.

The same symbol allocation may be applied to each slot in which TB transmission is performed. Information on symbol allocation used for PUSCH transmission in each slot may be indicated through a time domain resource assignment field of DCI for scheduling PUSCH. The value of SLIV applied by the UE for PUSCH transmission is indicated through the time domain resource assignment field, through this, the PUSCH transmission start symbol position (S) and the transmission symbol length (L) in the slot may be indicated. The UE may use the S-th symbol to the S+L−1 th symbol in the slot for PUSCH transmission.

Meanwhile, a technique of transmitting one transport block (TB) using symbol resources located in a plurality of slots for coverage enhancement (CE) of a PUSCH may be introduced. Specifically, the time resource constituting the PUSCH is composed of consecutive/non-consecutive symbols located over a plurality of slots, and it may mean that one TB is mapped to the corresponding PUSCH resource and transmitted.

Alternatively, one PUSCH consists of symbol resources located in one slot, it may mean that one TB is mapped using a plurality of PUSCH resources located in different slots.

That is, as a result, one TB is mapped and transmitted to consecutive/non-consecutive symbol resources located in a plurality of different slots. In the present disclosure, such a transmission scheme is referred to as multi-slot TB mapping.

The following table illustrates an information element (PUSCH-TimeDomainResourceAllocationNew IE) related to time domain resource allocation of PUSCH.

TABLE 5

```
-- ASN1START
-- TAG-PUSCH-TIMEDOMAINRESOURCEALLOCATIONLISTNEW-START
PUSCH-TimeDomainResourceAllocationListNew-r16 ::= SEQUENCE (SIZE(1..maxNrofUL-Allocations-
r16)) OF PUSCH-TimeDomainResourceAllocationNew-r16
PUSCH-TimeDomainResourceAllocationNew-r16 ::= SEQUENCE {
    k2-r16                       INTEGER (0 ... 32)            OPTIONAL,    -- Need S
    mappingType-r16              ENUMERATED {typeA, typeB}     OPTIONAL,    -- Cond RepTypeA
    startSymbolAndLength-r16     INTEGER (0 ... 127)           OPTIONAL,    -- Cond RepTypeA
    startSymbol-r16              INTEGER (0 ... 13)            OPTIONAL,    -- Cond RepTypeB
    length-r16                   INTEGER (1 ... 14)            OPTIONAL,    -- Cond RepTypeB
    numberOfRepetitions-r16                                    ENUMERATED {n1, n2, n4, n7, n12, n16},
    ...
}
-- TAG-PUSCH-TIMEDOMAINRESOURCEALLOCATIONLISTNEW-STOP
-- ASN1STOP
```

The information element (IE) of Table 5 may be used to establish a time domain relationship between the PDCCH for DCI format 0_1/0_2 and the PUSCH. In the information element, 'PUSCH-TimeDomainResourceAllocationList-New' may include one or more 'PUSCH-TimeDomainResourceAllocationNew'. In the UL grant, the network may indicate a time domain allocation that the UE should apply the corresponding UL grant among the configured time domain allocations. The UE may determine the bit width of the DCI field based on the number of entries of 'PUSCH-TimeDomainResourceAllocationListNew'. In the DCI field, the value of the DCI field and each element of the list may correspond such as a value of 0 refers to a first element of the list, a value of 1 refers to a second element of the list, and so on.

'k2' corresponds to the L1 (layer 1) parameter 'K2' (which may be denoted as K2) for DCI format 0_1/0_2. When this field is absent, the UE may apply the value 1 when the PUSCH SCS is 15/30 kHz, the value 2 when the PUSCH SCS is 60 kHz, and the value 3 when the PUSCH SCS is 120 KHz.

'length' indicates a length allocated to PUSCH for DCI format 0_1/0_2.

'mappingType' indicates a mapping type for DCI format 0_1/0_2.

'numberOfRepetitions' sets the number of repetitions for DCI format 0_1/0_2.

'startSymbol' indicates the index of the start symbol of the PUSCH for DCI format 0_1/0_2.

'startSymbolAndLength' is an index providing a valid combination of a start symbol and length (co-encoded) as a start and length indicator (SLIV) for DCI format 0_1/0_2. The network sets this field so that assignments do not cross slot boundaries.

The present disclosure proposes a method for determining the number of slots and TB size to which one TB is mapped when PUSCH TB mapping to multiple slots is performed to improve the coverage of the UE.

Hereinafter, although described in terms of PUSCH transmission, the contents of the present disclosure may be applied to transmission of other channels such as PUCCH, PDSCH, and PDCCH as well as PUSCH.

Hereinafter, PUSCH repetitions (which may be referred to as TB repetitions) are described on the assumption that PUSCH repetition type A is applied.

In the present disclosure, an available slot or an available slot for PUSCH transmission may mean at least one of the following 1) to 3).

1) It may mean an uplink slot. That is, the available slot may mean a slot in which all symbols in the slot are composed of uplink symbols. For example, it may mean a slot in which all symbols in the slot are configured as uplink.through tdd-UL-DL-ConfigurationCommon or tdd-UL-DL-ConfigurationDedicated from the network.

2) It may mean a slot in which all symbols used for PUSCH transmission in the slot are composed of uplink symbols. As an example, it may mean a slot in which all symbols used for PUSCH transmission in the slot are configured as uplink through tdd-UL-DL-ConfigurationCommon or tdd-UL-DL-ConfigurationDedicated.

3) It may mean a slot in which all symbols used for PUSCH transmission in the slot are composed of flexible or uplink symbols. For example, it may mean a slot in which all symbols used for PUSCH transmission in the slot are configured as flexible or uplink through tdd-UL-DL-ConfigurationCommon or tdd-UL-DL-ConfigurationDedicated. The flexible symbol should not be a symbol in which an SS/PBCH block (SSB) is transmitted.

A slot that is not available for PUSCH transmission or a non-available slot may mean a slot that does not satisfy the above conditions.

At this time, in order to determine whether a certain slot is available, that is, to determine whether a symbol can be used for PUSCH transmission, only RRC configuration such as tdd-UL-DL-ConfigurationCommon or tdd-UL-DL-ConfigurationDedicated may be considered, and dynamic signaling may not be considered.

Or to determine whether any symbols can be used for PUSCH transmission, dynamic signaling such as slot format indication by DCI format 2_0 as well as RRC configuration such as tdd-UL-DL-ConfigurationCommon or tdd-UL-DL-ConfigurationDedicated may also be considered.

Hereinafter, it is assumed the PUSCH is transmitted by applying multi-slot TB mapping in which one PUSCH TB is mapped to a plurality of slot resources and transmitted.

The plurality of slots to which the TB is mapped may be composed of slots consecutively or non-consecutively located slots in the time axis. When a TB is mapped to a plurality of slots, it means that the TB is mapped to all or some symbol resources located in the corresponding slots. In this case, slot resources to which one TB is mapped are called TB transmission occasions. In this case, one TB may perform continuous rate-matching for resources in a plurality of slots constituting a transmission occasion.

Hereinafter, TB processing over multi-slot (TBoMS) refers to transport block processing over multiple slots, and TBoMS may be applied to PUSCH transmission. A PUSCH to which TBoMS is applied may be referred to as a TBoMS PUSCH. The TBoMS PUSCH may be referred to as a PUSCH to which multi-slot TB mapping is applied, or may simply be referred to as TBoMS or PUSCH for convenience.

In TBoMS transmission, one TB is transmitted using a plurality of consecutive/non-consecutive slot resources. All or some symbol resources of each slot may be used for TBoMS transmission. The same symbol resources for a plurality of slot resources constituting the TBoMS may be used for TBoMS transmission. That is, each slot included in the plurality of slot resources may perform TBoMS transmission using the same symbol resources (for example, symbols used in the first slot and symbols used in the second slot may have the same position in the slot).

One TB is rate-matched and transmitted in slot resources constituting TBoMS transmission by the following methods. 1) rate-matched and transmitted based on the resources of all slots constituting TBoMS transmission, 2) rate-matched and transmitted based on that each slot is determined as a unit of rate matching and rate-matched based on the resources constituting the slot in each slot, 3) rate-matched and transmitted based on that a transmission occasion composed of multiple slots may be determined as a unit of rate matching, and may be rate-matched and transmitted based on the resources constituting the corresponding transmission occasion in each transmission occasion. The transmission occasion may be composed of a slot resource that can be used for one or a plurality of consecutive uplink transmission.

In the bit-selection process of determining the bits to be transmitted through rate matching among all coded bits, the composition of transmitted bits varies according to the RV value applied during rate matching. These RV values may 1) be changed by cycling for every rate matching unit, or 2) may be the same for all rate matching units, or 3) may be the same within the plurality of rate matching units, but may be changed by being cycled through the plurality of rate matching units as the rate matching unit. For example, when rate matching is performed in units of slots, the RV value may be cycled in units of transmission occasions. In this case, the same RV value is applied between slots belonging to the same transmission occasion, but the RV value may be cyclically changed for slots belonging to different transmission occasions.

Such TBoMS transmission may be repeatedly transmitted a plurality of times using additionally different time resources.

At this time, as a configuration method of TBoMS, the following can be considered.

<TBoMS Configuration Method 1>

As described above, slot resources to which one TB is mapped and transmitted, that is, slot resources constituting the TBoMS, may be referred to as a transmission occasion of TB. In this case, let assume that the number of slots constituting each transmission occasion is Z (Z is a natural number).

For PUSCH transmission, while multi-slot TB mapping is applied, repetition may be applied to further improve coverage. That is, TBoMS PUSCH transmission may be repeated. When the TBoMS PUSCH transmission is repeatedly performed K times, the TB is repeatedly transmitted K times through K transmission occasions. That is, one TB is transmitted in each TBoMS PUSCH transmission, and since the TBoMS PUSCH transmission is repeated K times, the TB is repeatedly transmitted K times.

Figure 11:
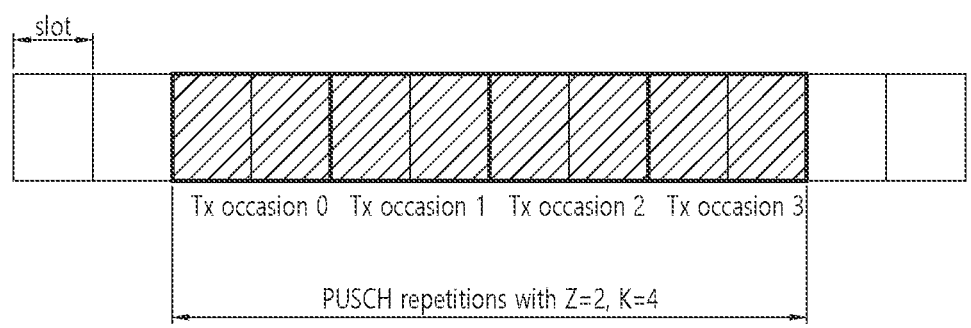
FIG. 11 illustrates a case in which TBoMS PUSCH transmission is repeated.

FIG. 11 illustrates a case in which TBoMS PUSCH transmission is repeated.

Referring to FIG. 11, a slot resource to which one TB is mapped (a slot resource constituting a TBoMS) consists of Z=2 slots, and the TB may be repeatedly transmitted K=4 times. In this case, each transmission occasion of TB repetition consists of Z=2 slots, and is repeatedly transmitted K=4 times from the 0th transmission occasion (Tx occasion 0) to the 3rd transmission occasion (Tx occasion 3).

That is, one TBoMS transmission is performed through a transmission occasion composed of Z slot resources, and this TBoMS transmission is repeatedly transmitted through K transmission occasions.

<TBoMS Configuration Method 2>

When a plurality of slot resources to which one PUSCH TB (i.e., one TB transmitted through PUSCH) is mapped and transmitted are referred to as a transmission occasion, transmission of the same PUSCH TB through a plurality of transmission occasions may be referred to as one TBoMS.

That is, when each transmission occasion is configured with Z=2 slot resources in FIG. 11, transmission of a TB using K=4 transmission occasions may be referred to as TBoMS.

In this case, one TBoMS transmission is composed in the form of repeated transmission through one or a plurality of transmission occasions, and each transmission occasion may be composed of one or a plurality of slot resources.

It may be considered that such TBoMS transmission is additionally repeatedly transmitted.

As a result, one or a plurality of transmission occasions may exist in a time duration in which one TB is mapped to multiple slots and transmitted.

In this case, each transmission occasion may consist of one or a plurality of continuous slot resources, physically. Slot resources that are discontinuous from each other constitute different transmission occasions.

One TB may be transmitted by rate matching in units of resources constituting each transmission occasion. Alternatively, one TB may be transmitted by rate matching in units of slots using the same RV value within the resources constituting each transmission occasion.

Now, the slot resources constituting the transmission occasion will be described in more detail.

When applying the <TBoMS configuration method 1> for TBoMS transmission, it is assumed that TBoMS transmission is repeated K times through K transmission occasions. In this case, a transmission occasion in the context of the present disclosure means a slot resource through which each TBoMS is transmitted.

On the other hand, if the <TBoMS configuration method 2> is applied for TBoMS transmission, it is assumed that one TBoMS transmission is transmitted through one or a plurality of transmission occasions. In this case, a transmission occasion in the context of the present disclosure means a slot resource constituting each transmission occasion constituting the transmission of the TBoMS.

(1) Transmission Occasions Consist of Consecutive Slots

The transmission occasion to which the TB of the PUSCH is mapped consists of Z slots consecutively located in the time axis. The 0th (first) transmission occasion of the TB repetition consists of Z consecutive slots from the PUSCH transmission start slot. The kth transmission occasion consists of consecutive Z slots from the next slot of the last slot constituting the k−1th transmission occasion. When the PUSCH TB repetition is performed K times, the transmission occasion of the TB repetition is composed of K transmission occasions (from #0 to #K−1).

Figure 12:
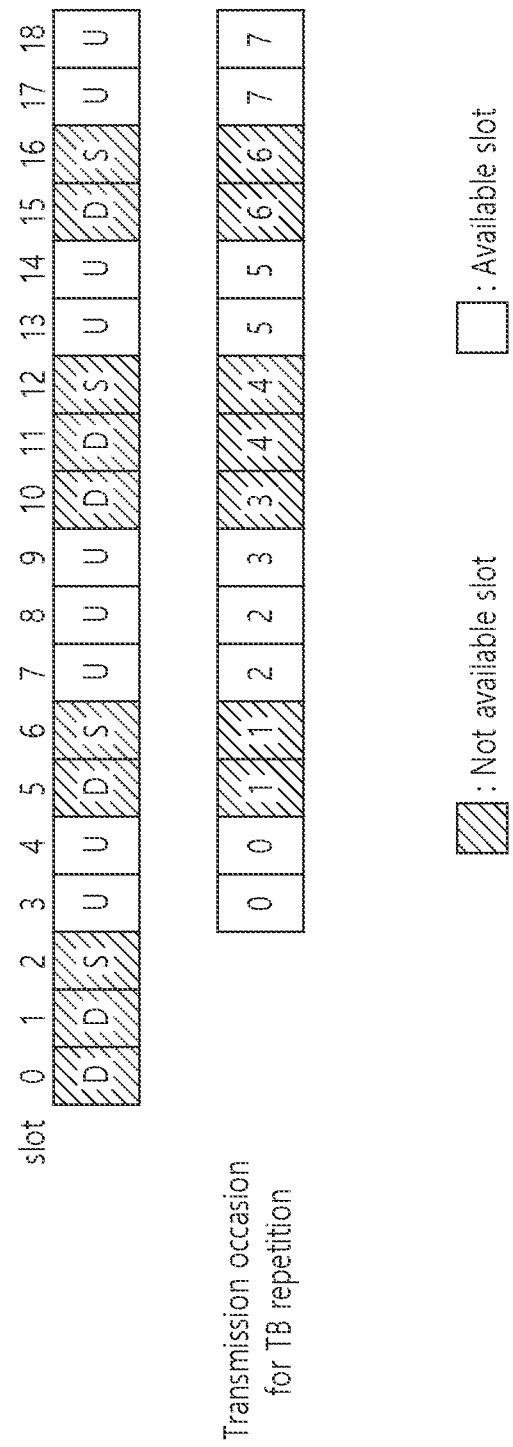
FIG. 12 illustrates a transmission occasion.

FIG. 12 illustrates a transmission occasion.

Referring to FIG. 12, each transmission occasion of PUSCH TB repetition consists of consecutive Z slots regardless of whether a slot is available for PUSCH transmission. In FIG. 12, transmission of PUSCH repetition starts in slot #3, and each transmission occasion of TB repetition is composed in units of consecutive Z=2 slots. In FIG. 12, a number indicated on a transmission occasion for TB repetition indicates an index of a transmission occasion to which a corresponding slot belongs.

A non-available slot may be included in the slot constituting the transmission occasion of the TB repetition.

For example, in transmission occasion #3, one of the two slots constituting the transmission occasion is a non-available slot, and in transmission occasions #1, #4, and #6, all two slots constituting the corresponding transmission occasion are non-available slots. In this case, PUSCH TB transmission at the corresponding transmission occasion may be performed as follows.

i) Unless all slots constituting the transmission occasion of TB repetition are slots available for PUSCH transmission (i.e., non-available slots exist/include), in the corresponding transmission occasion, PUSCH transmission is omitted.

ii) When slots that are not available for PUSCH transmission are included in the slots constituting the transmission occasion of TB repetition, in the corresponding slot, TB mapping is rate-matched or punctured. Therefore, when all slots constituting the transmission occasion are not available, PUSCH transmission is not performed (omitted) in the corresponding transmission occasion. If some slot(s) of the slots constituting the transmission occasion are not available, TB is mapped and transmitted using only available slot resources, TB mapping and transmission in non-available slot(s) are rate matched or punctured.

(2) Transmission Occasions Consist of Available Slots

A transmission occasion to which the TB of the PUSCH is mapped consists of Z available slots. The 0th (first) transmission occasion of the TB repetition consists of Z available slots from the PUSCH transmission start slot in a time domain. The k-th transmission occasion consists of Z available slots from the next slot of the last slot constituting the k−1 th transmission occasion in a time domain. When the PUSCH TB repetition is performed K times, the transmission occasion of the TB repetition is composed of K transmission occasions (from #0 to #K−1).

Figure 13:
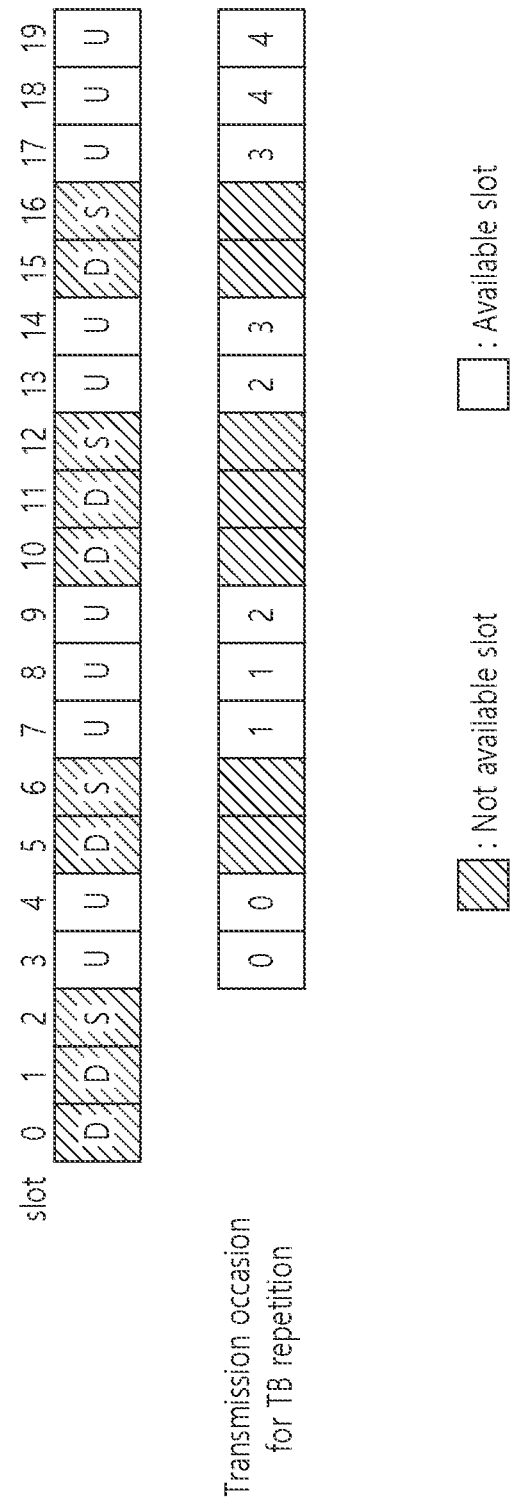
FIG. 13 illustrates an example of configuring each transmission occasion of PUSCH TB repetition using only available slots.

FIG. 13 is an example of configuring each transmission occasion of PUSCH TB repetition using only available slots.

Referring to FIG. 13, transmission of PUSCH repetition starts in slot #3, and each transmission occasion of TB repetition is configured in units of Z=2 available slots. The number indicated in the transmission occasion for TB repetition indicates the index of the transmission occasion to which the slot belongs.

In this case, the slots constituting the transmission occasion of TB repetition are composed of only available slots. When a non-available slot is included among slots constituting a transmission occasion, the transmission occasion consists of non-consecutive slots.

For example, based on tdd-UL-DL-ConfigurationCommon, tdd-UL-DL-ConfigurationDedicated, ssb-PositionsInBurst and the TDRA information field value of DCI format 0_1 or 0_2, the UE may determine Z·K slots for TBoMS PUSCH transmission scheduled by DCI format 0_1 or 0_2. At this time, at least one of the symbols indicated by the indexed row of the resource allocation table overlaps with the downlink symbol indicated by tdd-UL-DL-ConfigurationCommon or tdd-UL-DL-ConfigurationDedicated (if provided) or overlaps with the symbol of the SS/PBCH block known by ssb-PositionsInBurst, the corresponding slot is not counted in counting the number of Z·K slots for TBoMS PUSCH transmission. It can be expressed that the slots constituting the transmission occasion of TB repetition are composed of only available slots.

(3) Transmission Occasion Consists of Available and Consecutive Slots

The transmission occasion to which the TB of the PUSCH is mapped consists of Z slots which is continuously located on the time axis and all available.

The 0th (first) transmission occasion of TB repetition consists of the closest Z slots that satisfy the following conditions after the PUSCH transmission start slot.

Condition 1: Z slots consist of consecutive slots on the time axis

Condition 2: All Z slots consist of available slots

The k-th transmission occasion consists of Z slots satisfying the above conditions after the next slot of the slot constituting the k−1 th transmission occasion.

When the PUSCH TB repetition is performed K times, the transmission occasion of the TB repetition is composed of K transmission occasions (from #0 to #K−1).

Figure 14:
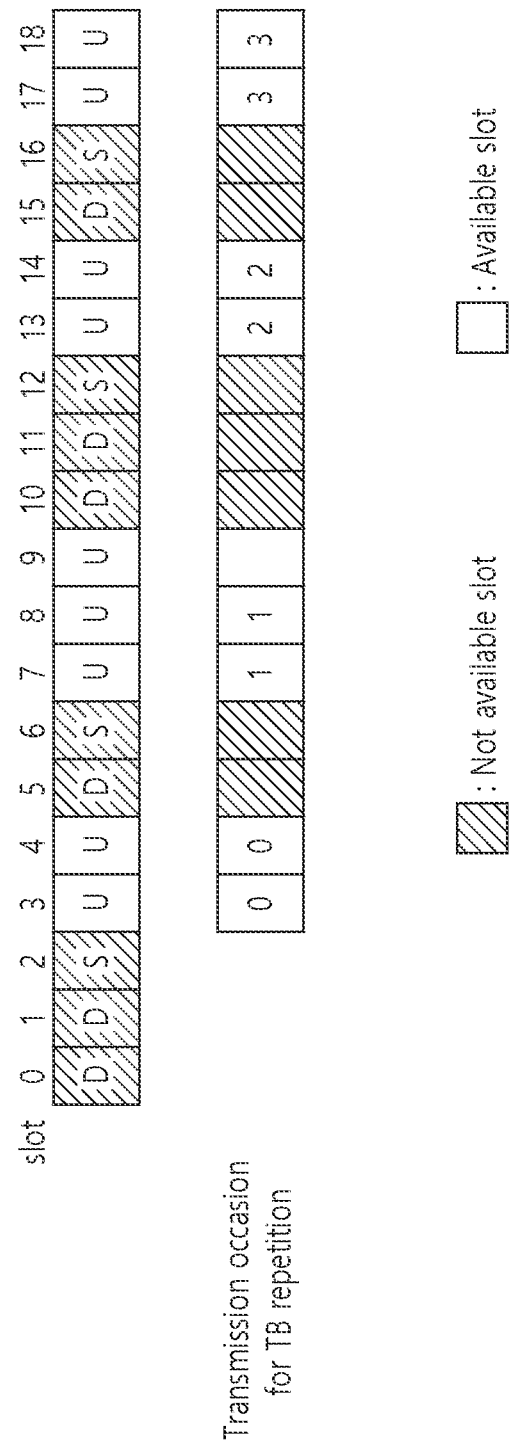
FIG. 14 illustrates an example of configuring a transmission occasion using available and consecutive slots.

FIG. 14 is an example in which a transmission occasion consists of available and consecutive slots.

Referring to FIG. 14, each transmission occasion of PUSCH TB repetition consists of only slots that are available for PUSCH transmission and are continuously located on the time axis. In FIG. 14, PUSCH repetition starts transmission in slot #3, and each transmission occasion of TB repetition is configured in units of Z=2 slots. The number indicated in the transmission occasion for TB repetition indicates the index of the transmission occasion to which the slot belongs. Slot #9, which is a slot next to the last slot constituting transmission occasion #1, is an available slot, but slot #10 is a non-available slot. Therefore, although slot #9 is an available slot, it is not included in the slot constituting the transmission occasion. Slot #13 and slot #14 become slots constituting transmission occasion #2.

When configuring the slot resource for the transmission occasion as described above, slot resources that are not used for PUSCH transmission may occur even though they are available for PUSCH transmission. Using these slot resources for possible PUSCH transmission may be effective in terms of latency reduction and coverage enhancement. For this, a method of configuring a transmission occasion modified in the above method may be used as follows.

The transmission occasion to which the TB of the PUSCH is mapped consists of $Z_{min}<=Z_k<=Z_{max}$ slots that are continuously located on the time axis and are all available.

The 0th (first) transmission occasion of TB repetition consists of the closest $Z_k$ (k=0)>=$Z_{min}$ slots that satisfy the following condition after the PUSCH transmission start slot. The k-th transmission occasion consists of $Z_k$>=$Z_{min}$ slots satisfying the following conditions after the next slot of the slot constituting the k−1 th transmission occasion.

Condition 1: $Z_k$ slots consist of consecutive slots on the time axis

Condition 2: All $Z_k$ slots consist of available slots

At this time, when the number of slots satisfying these conditions is $Z_{max}$ or more, $Z_k$=$Z_{max}$. When the number of slots satisfying these conditions is Z' and $Z_{min}<=Z'<=Z_{max}$, then $Z_k$=Z'.

More specifically, the values of $Z_{min}$ and $Z_{max}$ may be determined as follows.

First, the value of $Z_{min}$ may be as follows.

i) The $Z_{min}$ value may be indicated by higher layer signaling or DCI from the network.

ii) The $Z_{min}$ value may have a fixed value. Specifically, the value of $Z_{min}$ may be always fixed to 1.

iii) The $Z_{min}$ value can be set as a function of Z. For example, the value of $Z_{min}$ may be equal to alpha*Z. In this case, the value of Z may be indicated by higher layer signaling or DCI from the network. In this case, the value of alpha may be equal to or less than 1, and may have a fixed value or indicated through higher layer signaling or DCI from the network.

Next, the value of $Z_{max}$ may be as follows.

i) The $Z_{max}$ value may be indicated through higher layer signaling or DCI from the network.

ii) The $Z_{max}$ value may have a fixed value.

iii) $Z_{max}$ value can be set as a function of Z.

For example, the value of $Z_{max}$ may be equal to 2*Z−1. Or, for example, the value of $Z_{max}$ may be equal to beta*Z or beta*Z−1. In this case, the value of Z may be indicated from the network through higher layer signaling or DCI. In this case, the value of beta may be equal to or greater than 1, and may have a fixed value or indicated through higher layer signaling or DCI from the network.

Figure 15:
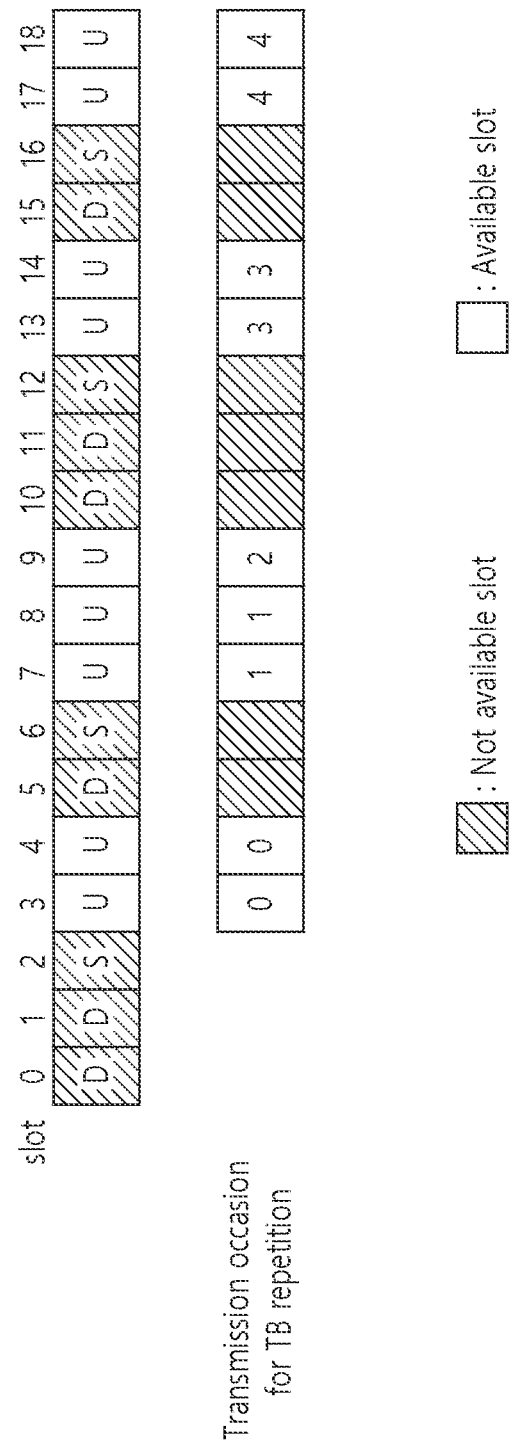
FIG. 15 illustrates another example of a transmission occasion.

FIG. 15 is another example of a transmission occasion.

Referring to FIG. 15, $Z_{min}$=1, $Z_{max}$=2. When PUSCH transmission starts in slot #3, the k-th transmission occasion of PUSCH TB repetition is composed of Z slot(s) that are available for PUSCH transmission and are consecutively located in the time axis. In FIG. 15, in the transmission occasions #0 and #1, since there are $Z_{max}$=2 consecutive available slots, the values of $Z_0$ and $Z_1$ are 2. In the case of the transmission occasion #2, since there is only one available slot consecutively from slot #9, it consists of $Z_2$=1 slot. Thereafter, in the case of transmission occasions #3 and #4, since there are $Z_{max}$=2 consecutive available slots, the values of $Z_3$ and $Z_4$ become 2.

Figure 16:
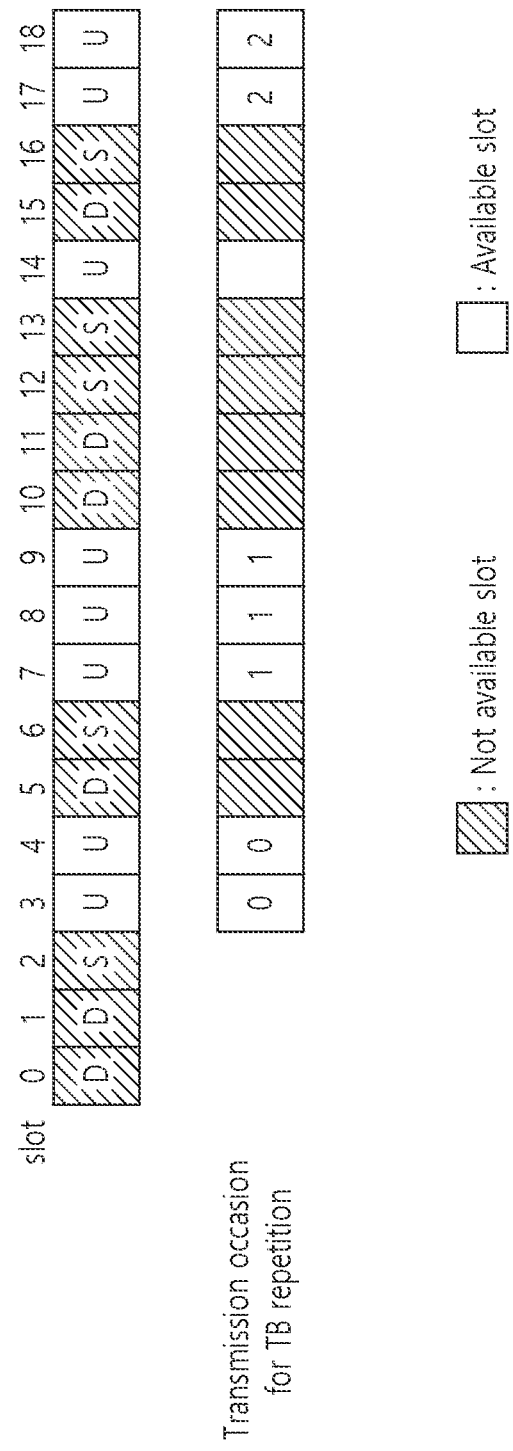
FIG. 16 illustrates another example of a transmission occasion.

FIG. 16 is another example of a transmission occasion.

Referring to FIG. 16, $Z_{min}$=2, $Z_{max}$=3. When PUSCH transmission starts in slot #3, the k-th transmission occasion of PUSCH TB repetition is composed of Z slot(s) that are available for PUSCH transmission and are consecutively located in the time axis. In FIG. 16, in the case of transmission occasion #0, two available slots exist continuously and $Z_{min}$=2, so the value of $Z_0$ is 2. In the transmission occasion #1, there are three consecutive available slots, and since $Z_{min}<=3<=Z_{max}$, the value of $Z_1$ becomes 3. In the case of the next available slot, slot #14, there are 1 (<$Z_{min}$) consecutive and available slots including slot #14, the corresponding slot is not included in the transmission occasion. Therefore, the next consecutive and available slots, slot #17 and slot #18, constitute a transmission occasion #2.

Alternatively, the slot resource constituting the transmission occasion may be configured as follows. The transmission occasion may be configured with consecutive slots from the start slot (e.g., slot #n) constituting the transmission occasion, and if a non-available slot (eg, slot #n+k) exists, slot #n to slot #n+k−1 may constitute one transmission occasion. In this case, in a specific situation (e.g., an FDD environment), the length of the transmission occasion may be too long because there are many available slots. To prevent this, the maximum number of slots ($Z_{max}$) constituting the transmission occasion may be set. In this case, even if a non-available slot is not met, when the number of slots constituting a transmission occasion reaches $Z_{max}$, the corresponding transmission occasion period is terminated.

When configuring a transmission occasion using the above methods, if TB repetitions are performed K times, there may be a total of K transmission occasions. Alternatively, when a specific slot arrives, the transmission of the corresponding TB may be terminated. That is, a TB is transmitted by generating a transmission occasion until a specific slot is reached. In this case, the specific slot may mean a W-th slot from the transmission start slot of the first transmission occasion. Alternatively, it may mean a W-th available slot by counting only available slots from the transmission start slot of the first transmission occasion. The W may be indicated from the network through RRC, DCI, or the like. W may be equal to the number of repetitions K of PUSCH.

<Time to Determine the Slot Resource Constituting the Transmission Occasion>

Whether a slot is an available slot for PUSCH transmission may vary according to settings/instructions such as tdd-UL-DL-ConfigurationCommon, tdd-UL-DL-ConfigurationDedicated, and/or a slot format indication by DCI format 2_0. When the corresponding setting is changed, availability information for the same slot may be changed. Therefore, when transmitting the PUSCH, the availability of a specific slot may vary depending on the timing at which the corresponding availability is determined. In particular, when the PUSCH is transmitted over multiple slots, a criterion for determining the availability of the PUSCH transmission slot needs to be clearly defined.

When multi-slot TB mapping is performed for PUSCH transmission and the corresponding TB is repeatedly transmitted K times (including K=1), available slots may be determined based on the following criteria.

i) Before the transmission of the first slot of the repeated transmission of the multi-slot TB is started, determination of the available slots for the corresponding transmission must be completed. That is, when repeated transmission of multi-slot TB starts in slot #n, the UE determines an available slot based on information in slot #n−1 or slot #n−k (k>=1). That is, the available slots of transmission including repeated transmissions are determined.

ii) Before the transmission of the first slot for each repetition of the multi-slot TB is started, determination of the available slots for the repeated transmission must be completed. That is, when the r-th repeated transmission of the multi-slot TB starts in slot #n, the UE determines an available slot for the corresponding repeated transmission based on information in slot #n−1 or slot #n−k (k>=1). That is, it determines available slots for specific repeated transmission.

iii) The availability of the slot must be determined before the transmission of each slot of the repeated transmission of the multi-slot TB. That is, the UE determines the availability of slot #n based on information in slot #n−1 or slot #n−k (k>=1). That is, availability is determined for a specific slot.

<RV Mapping for PUSCH TB Repetition (in Case of Single-Slot TB Mapping)>

When the repetition of the PUSCH TB is performed K times, the RV index may be determined according to the index of the transmission occasion of the PUSCH TB repetition.

Since the current PUSCH TB is mapped in one slot, and PUSCH TB repetition is performed through K consecutive slots, the kth transmission occasion of the TB repetition is performed in the kth next slot from the transmission start slot of the PUSCH. Accordingly, the RV index is cycled in units of slots from the PUSCH transmission start slot.

Figure 17:
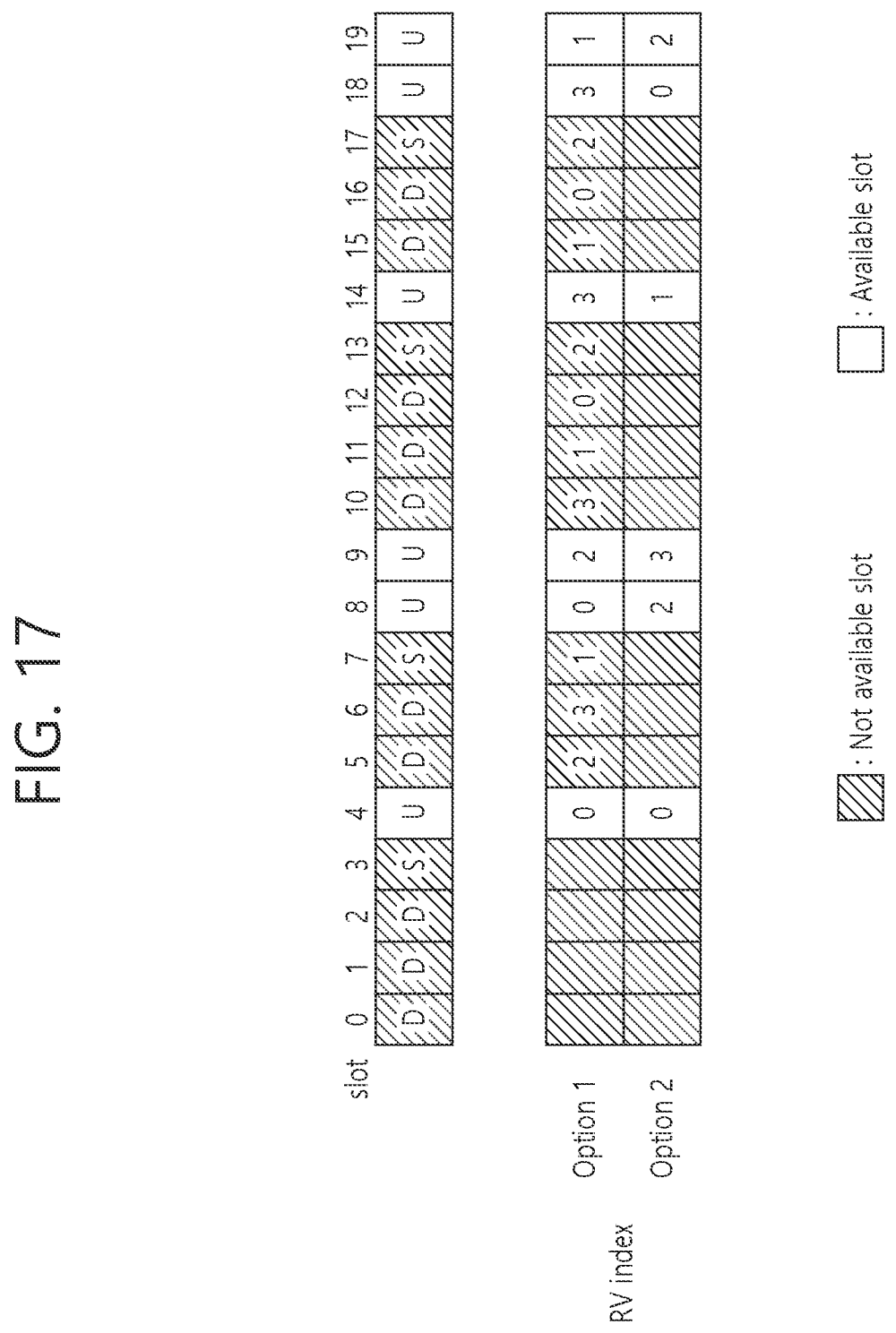

FIG. 17 illustrates an RV index applied to each TB transmission occasion.

Referring to FIG. 17, when PUSCH transmission is repeated starting from slot #4, an RV index applied to each TB transmission occasion is shown. Slots #4, #8, #9, #14, #18, and #19 are uplink (UL) slots (that is, slots in which all symbols of the slot are composed of UL symbols) and are slots in which PUSCH repetition can be performed. In the remaining slots, the PUSCH transmission symbol resource is not set to UL, so that the PUSCH cannot be transmitted.

In this case, according to the current standard specification, as in option 1, the RV index is circulated and determined in units of every slot from slot #4, which is the transmission start slot of the PUSCH. FIG. 17 shows an example in which the RV index is cyclically applied in the order of '0, 2, 3, 1' starting from 0. In this case, the RV indexes of 0, 0, 2, 3, 3, and 1 are sequentially applied to slots in which PUSCH transmission is actually performed, that is, slots #4, #8, #9, #14, #18, and #19, and in this case, the four RV values are applied unevenly according to the repetition.

When PUSCH repetition is performed K times, in order for actual PUSCH transmission to be performed in K slots, it may be considered that PUSCH repetition is configured based on slots in which PUSCH transmission is possible, rather than continuous slot resources. In this case, when the PUSCH repetition is performed K times, the PUSCH repetition may consist of K available slots.

When PUSCH TB is mapped in one slot, and PUSCH TB repetition (=TB repetition) is performed through K available slots, the k-th transmission occasion of TB repetition is performed in the k-th available slot after the transmission start slot of the PUSCH. The RV value is cycled and applied according to the index of the k-th transmission occasion of the TB repetition.

In FIG. 17, when slots #4, #8, #9, #14, #18, #19 are available slots for PUSCH transmission, as in option 2, from slot #4, which is the transmission start slot of the PUSCH, the RV index is cycled and determined according to the transmission occasion index of the PUSCH repetition. As described above, in FIG. 17, the RV index starts at 0 and is cyclically applied in the order of '0, 2, 3, 1'. In this case, RV indexes of 0, 2, 3, 1, 0, and 2 are sequentially applied to available slots for PUSCH transmission, i.e., slots #4, #8, #9, #14, #18, #19 (according to the transmission occasion of PUSCH TB repetition). In this case, four RV values may be equally applied according to repetition.

Similarly, when a PUSCH TB is mapped to a plurality of slot resources, an RV value may be applied to each TB. When the PUSCH TB is repeatedly transmitted K times, the RV value may be cyclically applied according to the transmission occasion index of each TB transmission. For example, the RV index applied to the k-th transmission occasion may be determined according to the value of 'k mod 4'. Specifically, the RV index ($rv_{id}$) applied to the k-th transmission occasion may be determined as shown in Table 4 above.

<Section A. Method 1 for Determining the Number of Slots for Multi-Slot TB Mapping>

The contents of this section are described based on the <TBoMS configuration method 1>. That is, a transmission occasion in this section means a slot resource constituting one TBoMS transmission. It is assumed that one TBoMS transmission is performed through a transmission occasion composed of Z slots, and this TBoMS can be repeatedly transmitted through K transmission occasions.

A method for determining the number of slots constituting a transmission occasion of each TB is proposed when multi-slot TB mapping is performed for PUSCH transmission and repetition is applied.

The UE may determine Z, which is the number of slots constituting the transmission occasion of each TB, as follows.

(1) Method of Configuring a Candidate Value of Z According to the PUSCH Transmission Frequency Resource Amount When the UE transmits the PUSCH using the multi-slot PUSCH mapping technique, the applied value of Z or the applicable candidate values of Z may vary according to frequency resource allocation of PUSCH. More specifically, it may depend on the following factors.

i) the value of $n_{PRB}$. $n_{PRB}$ means the number of PRBs allocated for PUSCH transmission.

ii) the value of $N_{RBG}$. $N_{RBG}$ means the number of resource block groups (RBGs) allocated for PUSCH transmission.

iii) the value of the RBG size (P). The RBG size (P) means the number of PRBs constituting an RBG for allocating frequency domain resources of a PUSCH.

For example, the applied Z value or applicable Z candidate values may vary according to the above factors as follows. Hereinafter, $n_{PRB}$ will be used for explanation for convenience of description, but $n_{PRB}$ may be interpreted as being replaced with $N_{RBG}$ or P.

1) When $n_{PRB}$ is less than or equal to a specific value, Z may have a value of 2 or greater than 2. That is, when $n_{PRB}$ is greater than a specific value, the value of Z is fixed/limited to 1. This means that multi-slot TB mapping is applicable only when $n_{PRB}$ is less than or equal to a specific value. The specific value may be as follows i) to iv). i) 1, ii) RBG size (P), iii) a value set by RRC, etc. by the network, iv) When the PRG size is expressed as P, P*alpha. In this case, alpha may be defined as a specific value in the standard or may be a value set by RRC or the like by the network.

2) The value of Z may be determined according to the value of $n_{PRB}$. That is, a value of Z that is 1:1 mapped according to $n_{PRB}$ may be set or defined. Specifically, the value of Z may be determined as follows. i) The value of Z according to $n_{PRB}$ may be defined as a specific value in the standard specification. ii) The value of Z according to $n_{PRB}$ may be set to RRC by the network. iii) The value of Z may be determined as max(1, floor($U_{max}/n_{PRB}$)) or ceil($U_{max}/n_{PRB}$). The value of $U_{max}$ may be defined in the standard as a specific value or may be set as RRC by the network.

3) Depending on the value of $n_{PRB}$, candidates for the value of Z that can be set to the UE through RRC or DCI may vary. That is, when the network indicates to the UE the value of Z applied when the UE transmits the PUSCH within a specific candidate set, the values of Z constituting the candidate set may be configured differently according to the value of $n_{PRB}$ applied to PUSCH transmission. For example, when $n_{PRB}$ is 1, the value of Z may be indicated among {1, 2, 4, 8}, when $n_{PRB}$ is 2, the value of Z may be indicated among {1, 2, 4}, when $n_{PRB}$ is 4, the value of Z may be indicated among {1, 2}.

Values constituting the candidate set of Z may be as follows.

i) A value constituting a candidate set of Z according to $n_{PRB}$ may be defined in a standard specification. ii) A value constituting the candidate set of Z according to $n_{PRB}$ may be set as RRC by the network. iii) A value constituting a candidate set of Z according to $n_{PRB}$ may be determined as {1, 2, 4, . . . , max(1, floor($U_{max}/n_{PRB}$))}. The value of $U_{max}$ may be defined in a standard as a specific value or may be set as RRC by the network. iv) A value constituting a candidate set of Z according to $n_{PRB}$ may be determined as {1, 2, 4, . . . , $U_{max}$}. In this case, the value of $U_{max}$ may vary according to the value of $n_{PRB}$. The value of $U_{max}$ according to $n_{PRB}$ may be defined in a standard specification or may be set as RRC by the network.

(2) A Method to Set Z and K Values

Among the candidate values of Z applicable to PUSCH transmission, the value of Z applied for PUSCH transmission may be determined as follows or configured/indicated from the network.

1) The UE may be configured with the value of Z from the network through RRC.

2) As described above, a specific value may be determined according to values of np, NRG, P, and the like.

3) The UE is instructed by the value of Z through DCI for scheduling PUSCH from the network. More specifically, the value of Z can be indicated through DCI using methods such as i) to iv) below.

i) The value of Z may be indicated through the 'Time domain resource assignment (TDRA)' field existing in DCI. The TDRA field value m of DCI provides the row index m+1 in the allocation table. That is, values corresponding to a specific row index of the TDRA table are applied for PUSCH transmission of the UE. In the past, values of {PUSCH mapping type, K2, SLIV (S and L), K} were indicated through the TDRA table/field. For example, when the UE is scheduled to transmit a transport block and not a CSI report, or when the UE is scheduled to transmit a transport block and CSI report(s) on PUSCH by DCI, the time domain resource assignment field value m of DCI provides the row index m+1 of the allocation table. The row indicated in the allocation table may define slot offset K2, start and length indicator SLIV (or direct start symbol S and allocation length L), PUSCH mapping type, the number of repetitions (if repetition is in the allocation table) K, to be applied to PUSCH transmission, may be defined.

For the indication of Z, the value of Z may be additionally indicated through the TDRA table. That is, the value of Z corresponding to the index of each row of the TDRA table may be set. The value of Z corresponding to each row index of the TDRA table may be set as RRC through the network. When the value of Z corresponding to the row index of the TDRA table does not exist (if not set), the value of Z may be assumed to be 1. For example, the allocation table may be provided as shown in the following table.

TABLE 6

| Row index | PUSCH mapping type | $K_2$ | S | L | Z (the number of slots) | K(the number of repetitions) |
|---|---|---|---|---|---|---|
| 1 | Type A | j | 0 | 14 | N1 | M1 |
| 2 | Type A | j | 0 | 12 | N2 | M2 |

TABLE 6-continued

| Row index | PUSCH mapping type | $K_2$ | S | L | Z (the number of slots) | K(the number of repetitions) |
|---|---|---|---|---|---|---|
| 3 | Type A | j | 0 | 10 | N3 | M3 |
| 4 | Type B | j | 2 | 10 | N4 | M4 |
| 5 | Type B | j | 4 | 10 | N5 | M5 |

When one TBoMS transmission is performed through a transmission occasion composed of Z slots and this TBoMS is repeatedly transmitted through K transmission occasions, the Z and K values may be provided by the table above. Z may be the number of symbols used for TBS determination. K may indicate a value of the number of repetitions to be applied to PUSCH transmission.

ii) The value of Z may be indicated through the 'Frequency domain resource assignment' field existing in the DCI. When multi-slot TB mapping is applied, the size of $n_{PRB}$ or $N_{RBG}$ may be limited to be less than or equal to a specific number. In this case, when multi-slot TB mapping is applied, only some limited values among the values of bits for indicating the position of a PRB used for PUSCH transmission may be actually used. Accordingly, M MSBs (or M LSBs) among bits for indicating the position of the PRB used for PUSCH transmission may be used to indicate the value of Z.

iii) The value of Z may be indicated through a new explicit field.

iv) The UE is configured/instructed the total number of transmission slots (i.e., W) of the PUSCH from the network. Additionally, the UE is configured/instructed from the network for the number of repetitions of PUSCH K. At this time, the UE determines that the Z value, which is the number of slots to which the TB is mapped, is equal to W/K or floor (W/K).

4) The UE may determine the value of the number of repetitions K of the PUSCH as Z, which is the number of slots for multi-slot TB mapping. That is, when the number of repetitions K of the PUSCH is set/indicated, the UE may interpret the corresponding value as Z, which is the number of slots for multi-slot TB mapping. In this case, the UE may determine that the repetition of the TB is not performed (i.e., the number of repetitions=1). That is, when the TB is transmitted through the multi-slot TB mapping, the repetition of the TB is not performed.

The repetition number K of PUSCH may be determined as follows.

1) As before, a value K of the number of repetitions of PUSCH is set/indicated from the network through RRC/DCI. When indicated by DCI, the K value may be indicated through the TDRA field of DCI.

2) The UE is set/indicated the total number of transmission slots (i.e., W) of the PUSCH from the network. In addition, the UE determines the value of Z, which is the number of slots to which the TB is mapped, or is set/indicated from the network through the above method. At this time, the UE determines that the repetition number K value of the PUSCH is equal to W/Z or floor (W/Z).

3) The value or range of values of the applicable (configurable) repetition number K may vary according to the value Z, which is the number of slots to which TB is mapped, applied to PUSCH transmission. For example, when Z is set to 1, the network may indicate to the UE one of {1, 2, 4, 7, 12, 16} as the K value, and when Z is set to 2, the network may indicate to the UE one of {1, 2, 4, 7} as the K value.

More specifically, i) the set of K values that the network can set/indicate to the UE may be configured differently depending on the Z value. For this, a set of applicable K values according to the Z value may be independently defined/set. Alternatively, the network may set/change the configuration of the set of K values applied to the UE for this purpose. The network may set/instruct one of the values included in this set of K values to the UE as the number of repetitions of PUSCH transmission.

ii) When Z is 1, let $K_{max}$ be the maximum value of K that the network can set/instruct to the UE. Then, according to the Z value, the maximum value of K that the network can set/instruct to the UE may be limited as $K_{max}/Z$ (or floor ($K_{max}/Z$)). When the $K_{max}/Z$ (or floor ($K_{max}/Z$)) value is not included in the candidate values of K that the network can set/indicate to the UE, the largest value among values less than or equal to $K_{max}/Z$ becomes the maximum value of K that the network can set/instruct to the UE.

iii) When the maximum value of K that the network can set/instruct to the UE is $K_{max}$, if the K value set/instructed by the network to the UE is greater than $K_{max}/Z$ (or floor ($K_{max}/Z$)), the UE determines that $K_{max}/Z$ (or floor ($K_{max}/Z$)) is the number of repetitions of PUSCH.

The number of slots (Z) in which the TBoMS is transmitted and the number of repetitions (K) of the TBoMS may be determined as follows.

(a) The Z value and the K value can be independently set through the TDRA field of DCI.

In this case, as a TDRA table applied for TBoMS transmission, a dedicated TDRA table independent of the TDRA table for conventional PUSCH transmission may be applied. Alternatively, the TDRA table applied for TBoMS transmission reuses the TDRA table for the existing PUSCH transmission, but the Z value and K value may be included as additional columns/parameters.

In this case, the value of Z*K may be limited to a specific value M or less. If the product of the set Z value and K value is greater than M, the UE may determine the values of Z and K as follows.

Based on the set Z value, the UE determines that the maximum K value satisfying Z*K<=M is the applied K value. Alternatively, it is determined that the maximum value satisfying Z*K<=M among candidate values (e.g., {1, 2, 4, 7, 12, 16}) that can be configured to the UE is the applied K value.

Alternatively, based on the set K value, the UE determines that the maximum Z value satisfying Z*K<=M is the applied Z value. Alternatively, it is determined that the maximum value that satisfies Z*K<=M among candidate values (e.g., {2, 4, 8}) that can be configured to the UE is the applied Z value.

(b) The value of Z is independently set through the TDRA field of DCI, and the value of K may be replaced with 'NumberOfRepetition'. In this case, the TDRA table applied for TBoMS transmission reuses the existing TDRA table for PUSCH transmission, but the Z value may be included as an additional column/parameter. The 'NumberOfRepetition' value, which previously meant the number of repetitions of the PUSCH, may be interpreted as a value of K.

In this case, the value of Z*K may be limited to a specific value M or less. If the product of the set Z value and K value is greater than M, the UE may determine the values of Z and K as follows.

i. Based on the set Z value, the UE determines that the maximum K value satisfying $Z*K<=M$ is the applied K value. Alternatively, it is determined that the maximum value satisfying $Z*K<=M$ among candidate values (e.g., {1, 2, 4, 7, 12, 16}) that can be configured to the UE is the applied K value.

ii. Based on the set K value, the UE determines that the maximum Z value satisfying $Z*K<=M$ is the applied Z value. Alternatively, it is determined that the maximum value that satisfies $Z*K<=M$ among candidate values (e.g., {2, 4, 8}) that can be configured to the UE is the applied Z value.

(c) The values of Z and K may be set as separate independent indexes through the TDRA field. That is, a specific value W is set through TDRA, and the values of Z and K are determined according to the value of W. For this, {Z, K} values mapped to each value of W may be set in advance through RRC. In this case, as a TDRA table applied for TBoMS transmission, a dedicated TDRA table independent of the TDRA table for existing PUSCH transmission is applied, and the value of W may be included in this dedicated TDRA table. Alternatively, the TDRA table applied for TBoMS transmission reuses the existing TDRA table for PUSCH transmission, but the W value may be included as an additional column/parameter.

(d) The value of Z is independently set through the TDRA field of DCI, and the value of K may be replaced with 'NumberOfRepetition/Z'. In this case, the TDRA table applied for TBoMS transmission reuses the TDRA table for the existing PUSCH transmission, but Z values can be included as additional columns/parameters. It can be determined that the value of K is equal to 'NumberOfRepetition/Z' by using the 'NumberOfRepetition' value which means the number of repetitions of the existing PUSCH.

TBoMS transmission may be dynamically activated/deactivated (enabling/disabling). When TBoMS transmission is deactivated, conventional PUSCH transmission is performed, and when TBoMS transmission is activated, TBoMS transmission can be performed.

(a) At this time, TBoMS transmission may be activated/deactivated through an explicit field of DCI.

(b) Alternatively, when the Z value, which is the number of slots constituting the TBoMS, is set by the DCI, the UE may determine activation/deactivation of the TBoMS by using the Z value. The UE may determines that TBoMS transmission is activated when the set value of Z is 2 or more and the value of Z is the number of slots constituting the TBoMS. When the set value of Z is 1, it can be determined that TBoMS transmission is deactivated.

(c) Alternatively, the UE may determine activation/deactivation of TBoMS by using the alpha value, which is a scaling factor used to determine the TB size of TBoMS, proposed in Section B, which will be described later. This alpha value may be indicated through DCI. When the set alpha value is 2 or more, TBoMS transmission is activated, and the corresponding alpha value may be applied as a scaling factor used to determine the TB size of TBoMS. When the set alpha value is 1, it can be determined that TBoMS transmission is deactivated.

This value of alpha may be interpreted by being replaced with a value of beta used for determining the TB size of TBoMS proposed in Section B below.

A-1. Method 2 for Determining the Number of Slots for Multi-Slot TB Mapping

The contents of this section are described based on the <TBoMS configuration method 2>. That is, a transmission occasion in this section means a slot resource constituting each transmission occasion when one TBoMS consists of one or a plurality of transmission occasions. That is, one TBoMS transmission may be performed through K transmission occasions, and each transmission occasion may be configured through Z slot resources. In this case, the value of Z may be the same or different for each transmission occasion.

When performing multi-slot TB mapping for PUSCH transmission and applying repetition, suggested is a method for determining the total number of slots constituting a TBoMS composed of a plurality of transmission occasions.

1) The UE may be configured with information on the number of slots constituting the TBoMS from the network.

i) The UE may be instructed on the slot length constituting the TBoMS through DCI from the network. ii) When the UE is instructed to a value of the number of repetitions of the PUSCH through RRC/DCI from the network, the UE may determine the number of repetitions as the number of slots constituting the TBoMS.

When the number of slots constituting the TBoMS is N, the UE determines that the TBoMS is configured through N slot resources.

2) The UE may be configured with information about the number of TOTs (Transmission Occasion of TBoMS) constituting the TBoMS from the network.

i) The UE is instructed by the network the number of TOTs constituting the TBoMS. The number of such TOTs may be indicated through the TDRA field of DCI. ii) When the UE receives an indication of the number of repetitions of the PUSCH through RRC/DCI from the network, the UE may determine the number of repetitions as the number of TOTs constituting the TBoMS.

When the number of such TOTs is K, the UE determines that the TBoMS consists of K transmission occasions.

When the aforementioned <TBoMS configuration method 2> is applied, it can be assumed that the repetition of TBoMS is not performed when TBoMS transmission is performed. That is, either one of i) repetition or ii) TBoMS transmission may be applied for transmission of a specific PUSCH. In this case, the UE needs to determine whether repetition is applied to PUSCH transmission or whether TBoMS transmission is applied. On the other hand, the above-mentioned value of Z may be a value that the UE receives from the network through RRC/DCI or the like. Here, if the value of Z is set to 1 or all transmission occasions constituting TBoMS transmission consist of one slot, the UE determines that TBoMS transmission is not applied and repetition is applied for PUSCH transmission. Otherwise, the UE may determine that TBoMS transmission is applied for PUSCH transmission.

<Section B. Method of Determining TB Size in Multi-Slot TB Mapping>

Because the TB of the conventional PUSCH was transmitted in one slot, the TB size (TBS) of the PUSCH was determined based on the number of resource elements (REs) used for PUSCH transmission in the slot. However, when applying multi-slot TB mapping and repetition for PUSCH transmission, since the number of REs to which TB is mapped becomes larger than before, the method of determining the TB size needs to be changed so that it can have a larger TB size (TBS).

In the case of performing multi-slot TB mapping and applying repetition, a method of determining the TB size is proposed below.

(1) TBS Determination Method 1.

A method to change the formula for determining $N'_{RE}$.

In order to determine the TBS used for PUSCH transmission, the UE first determines the number of REs within the slot (let's call it $N_{RE}$). To this end, the UE first determines the number of REs ($N'_{RE}$) used for PUSCH allocation in one PRB as $N'_{RE}=N^{RB}_{sc} \cdot N^{sh}_{symb}-N^{PRB}_{DMRS}-N^{PRB}_{oh}$. Thereafter, the number of REs ($N_{RE}$) in a slot used for PUSCH transmission is determined as $N_{RB}=\min(156, N'_{RE}) \cdot n_{PRB}$.

Here, $N^{RB}_{sc}$ is the number of subcarriers in the frequency domain in the PRB, and may be 12. $N^{sh}_{symb}$ means the number of symbols L of PUSCH allocation. $NP^{PRB}_{DMRS}$ is the number of REs for DM-RS per PRB in the allocated duration including the overhead of the DM-RS CDM groups without data. $N^{PRB}_{oh}$ is an overhead set by a higher layer parameter. If $NP^{RB}_{oh}$ is not set (to one of the values of 6, 12 or 18), $N^{PRB}_{oh}$ is assumed to be 0. For message 3 transmission, $N^{PRB}_{oh}$ is always set to 0. In the case of PUSCH repetition type B, $N^{PRB}_{DMRS}$ is determined assuming a nominal repetition having a period of L symbols without division. $n_{PRB}$ is the total number of PRBs allocated to the UE. For PUSCH scheduled by a fallback random access response (fallbackRAR) UL grant, the UE may assume that the TB size determined by the UL grant in the fallback RAR should be the same as the TB size used for the message A PUSCH transmission.

In order to determine the TBS used for PUSCH transmission in multi-slot TB mapping, in the above process, the UE may use i) the number of REs in a resource unit or ii) the number of REs in slots for TB mapping instead of the number of REs in a slot. In this case, $N_{RE}$ does not mean the number of REs in a slot, but may mean the number of REs in a resource unit or the number of REs in slots for TB mapping.

To this end, the number of REs ($N'_{RE}$) used for PUSCH allocation in one PRB may be determined as follows.

1) It can be determined as $N'_{RE}=N^{RB}_{sc} \cdot N^{sh}_{symb}-N^{PRB}_{DMRS}-N^{PRB}_{oh}$. Each parameter included in this formula can mean:

$N^{RB}_{sc}$ is the number of subcarriers in the frequency domain in the PRB.

$N^{sh}_{symb}$ is the number of symbols of PUSCH allocation. When multi-slot TB mapping is performed, this value means the total number of symbols constituting PUSCH transmission on which one TB mapping is performed. That is, it means the total number of symbols used for PUSCH allocation in a plurality of slot resources on which PUSCH TB mapping is performed.

$N^{PRB}_{DMRS}$ is the number of REs for DM-RS per PRB in the allocated duration including the overhead of the DM-RS CDM groups without data. When multi-slot TB mapping is performed, this value means the number of REs used for DM-RS transmission 'in the entire symbol resources constituting PUSCH transmission within a transmission occasion in which one TB mapping is performed on the time axis' and 'in the subcarrier resources constituting one PRB on the frequency axis'. At this time, this number includes the overhead of the DM-RS CDM group without data. Or when multi-slot TB mapping is performed, $N^{PRB}_{DMRS}$ may be replaced with $N^{PRB}_{DMRS}$ alpha in the formula for determining $N'_{RE}$. This method may be used when the same symbol allocation for each slot is applied to slot resources on which TB mapping is performed.

$N^{PRB}_{oh}$ is an overhead set by a higher layer parameter (e.g., xOverhead in PUSCH-ServingCellConfig).

It can be determined as $N'_{RE}=(N^{RB}_{sc} \cdot N^{sh}_{symb}-N^{PRB}_{DMRS}-N^{PRB}_{oh}) \cdot$ alpha. At this time, each parameter follows the existing definition as it is. When the value of $N'_{RE}$ is determined as described above, the UE may determine the value of $N_{RE}$ as $N_{RE}=\min(156 \text{ alpha}, N'_{RE}) \, n_{PRB}$. In this case, the value of alpha may be determined as follows (4) of this section B.

(2) TBS Determination Method 2.

A method to change the formula for determining $N_{RE}$.

In order to determine a TBS used for PUSCH transmission, the UE first determines the number of REs in a slot. To this end, the UE first determines the number of REs ($N'_{RE}$) used for PUSCH allocation in one PRB as $N'_{RE}=N^{RB}_{sc} \cdot N^{sh}_{symb}-N^{PRB}_{DMRS}-N^{PRB}_{oh}$.

$N^{RB}_{sc}$ is the number of subcarriers in the frequency domain in the PRB, and may be 12.

$N^{sh}_{symb}$ means the number of symbols L of PUSCH allocation. When multi-slot TB mapping is performed, this value means the total number of symbols constituting PUSCH transmission to which one TB mapping is performed. That is, it means the total number of symbols used for PUSCH allocation in a plurality of slot resources on which PUSCH TB mapping is performed.

$N^{PRB}_{DMRS}$ is the number of REs for DM-RS per PRB in the allocated duration including the overhead of the DM-RS CDM groups without data. When multi-slot TB mapping is performed, this value means the number of REs used for DM-RS transmission 'in the entire symbol resources constituting PUSCH transmission within a transmission occasion in which one TB mapping is performed on the time axis' and 'in the subcarrier resources constituting one PRB on the frequency axis'. At this time, this number includes the overhead of the DM-RS CDM group without data.

$N^{PRB}_{oh}$ is an overhead set by a higher layer parameter (e.g., xOverhead in PUSCH-ServingCellConfig).

Thereafter, the number of REs ($N_{RE}$) in a slot used for PUSCH transmission is determined. At this time, in order to determine the TBS used for PUSCH transmission during multi-slot TB mapping, instead of the number of REs in a slot, the UE may use i) the number of REs in a resource unit or ii) the number of REs in slots for TB mapping. In this case, $N_{RE}$ may mean the number of REs in a resource unit or the number of REs in slots for TB mapping, not the number of REs in a slot. For this, the following equation can be used:

$$N_{RE}=\min(156, N'_{RE}) \cdot \text{alpha} \cdot n_{PRB} \quad \text{[Equation 1]}$$

In this case, for example, the value of alpha may be equal to the number of slot(s) to which PUSCH TB is mapped. The number of slots to which PUSCH TB is mapped may be the same as the number of slots (=Z) to which PUSCH TB is mapped, indicated by the network/donor node. The value of Z may be indicated in the same way as in 'Section A'.

Based on the $N_{RE}$ value determined as described above, the value of $N_{info}$ is determined. The $N_{info}$ value may be determined as $N_{info}=N_{RE} \cdot R \cdot Q_m \cdot v$. Here, R denotes a target code rate, $Q_m$ denotes a modulation order, and v denotes the number of layers.

First, if $N_{info}$ is 3824 or less, it is based on the following equation.

$$N'_{info} = \max\left(24, 2^n \cdot \left\lfloor \frac{N_{info}}{2^n} \right\rfloor\right) \text{ where } n = \max(3, \lfloor \log_2(N_{info}) \rfloor - 6) \quad \text{[Equation 2]}$$

$N'_{info}$ is a quantized intermediate number of information bits.

At this time, using the table below to find the closest TBS value that is not less than N'$_{info}$.

TABLE 7

| Index | TBS | Index | TBS | Index | TBS | Index | TBS |
|---|---|---|---|---|---|---|---|
| 1 | 24 | 31 | 336 | 61 | 1288 | 91 | 3624 |
| 2 | 32 | 32 | 352 | 62 | 1320 | 92 | 3752 |
| 3 | 40 | 33 | 368 | 63 | 1352 | 93 | 3824 |
| 4 | 48 | 34 | 384 | 64 | 1416 | | |
| 5 | 56 | 35 | 408 | 65 | 1480 | | |
| 6 | 64 | 36 | 432 | 66 | 1544 | | |
| 7 | 72 | 37 | 456 | 67 | 1608 | | |
| 8 | 80 | 38 | 480 | 68 | 1672 | | |
| 9 | 88 | 39 | 504 | 69 | 1736 | | |
| 10 | 96 | 40 | 528 | 70 | 1800 | | |
| 11 | 104 | 41 | 552 | 71 | 1864 | | |
| 12 | 112 | 42 | 576 | 72 | 1928 | | |
| 13 | 120 | 43 | 608 | 73 | 2024 | | |
| 14 | 128 | 44 | 640 | 74 | 2088 | | |
| 15 | 136 | 45 | 672 | 75 | 2152 | | |
| 16 | 144 | 46 | 704 | 76 | 2216 | | |
| 17 | 152 | 47 | 736 | 77 | 2280 | | |
| 18 | 160 | 48 | 768 | 78 | 2408 | | |
| 19 | 168 | 49 | 808 | 79 | 2472 | | |
| 20 | 176 | 50 | 848 | 80 | 2536 | | |
| 21 | 184 | 51 | 888 | 81 | 2600 | | |
| 22 | 192 | 52 | 928 | 82 | 2664 | | |
| 23 | 208 | 53 | 984 | 83 | 2728 | | |
| 24 | 224 | 54 | 1032 | 84 | 2792 | | |
| 25 | 240 | 55 | 1064 | 85 | 2856 | | |
| 26 | 256 | 56 | 1128 | 86 | 2976 | | |
| 27 | 272 | 57 | 1160 | 87 | 3104 | | |
| 28 | 288 | 58 | 1192 | 88 | 3240 | | |
| 29 | 304 | 59 | 1224 | 89 | 3368 | | |
| 30 | 320 | 60 | 1256 | 90 | 3496 | | |

Next, if N$_{info}$ is greater than 3824, it is based on the following equation.

$$N'_{info} = \max\left(3840, 2^n \times \text{round}\left(\frac{N_{info} - 24}{2^n}\right)\right) \text{ where } n = \lfloor \log_2(N_{info} - 24) \rfloor - 5$$ [Equation 3]

and ties in the round function are broken towards the next largest integer.

If, 1) R (target code rate) is 1/4 or less, TBS is determined as follows.

$$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil$$ [Equation 4]

2) Else, i) If N'$_{info}$ is greater than 8424, TBS is determined as follows.

$$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil$$ [Equation 5]

ii) If N'$_{info}$ is less than or equal to 8424, TBS is determined as shown in the following equation.

$$TBS = 8 \cdot \left\lceil \frac{N'_{info} + 24}{8} \right\rceil - 24$$ [Equation 6]

(3) TBS Determination Method 3.

A method to change the formula for determining N$_{info}$.

The UE may use Equations 2 to 6 above to determine the TBS used for PUSCH transmission.

On the other hand, the N$_{info}$ value for determining the TBS used for transmission of the PDSCH is, i) for PDSCH allocated by PDCCH with DCI format 1_0, 1_1 or 1_2 with CRC scrambled by C-RNTI, MCS-C-RNTI, TC-RNTI, CS-RNTI or SI-RNTI, N$_{info}$=N$_{RE}$·R·Q$_m$·v.

ii) For a PDSCH allocated by PDCCH with DCI format 1_0 with CRC scrambled by P-RNTI, RA-RNTI or MsgB-RNTI, N$_{info}$=S·N$_{RE}$·R·Q$_m$·v.

That is, in the case of general PDSCH transmission, N$_{info}$ is determined as N$_{info}$=N$_{RE}$·R·Q$_m$·v. However, in the case of PDSCH allocated by PDCCH with DCI format 1_0 with CRC scrambled by P-RNTI, RA-RNTI or MsgB-RNTI, N$_{info}$ is determined as N$_{info}$=S·N$_{RE}$·R·Q$_m$·v. Here, S means a scaling factor, and may be indicated as one of 1, 0.5, and 0.25 through the TB scaling field of DCI.

When multi-slot TB mapping is applied, in order to determine the TBS used for PUSCH transmission, the value of N$_{info}$ may be determined as follows.

i) N$_{info}$ may be determined as N$_{info}$=alpha·N$_{RE}$·R·Q$_m$·v.

ii) N$_{info}$ may be determined as N$_{info}$=beta·N$_{RE}$·R·Q$_m$·v.

iii) N$_{info}$ may be determined as N$_{info}$=alpha·beta·N$_{RE}$·R·Q$_m$·v.

In this case, the values of alpha and beta may have the same characteristics as in section B.(4) below. One of the TBS determination methods may be applied. Alternatively, the 'TBS determination method 1' or 'TBS determination method 2' and 'N$_{info}$=beta·N$_{RE}$·R·Q$_m$·v' of the 'TBS determination method 3' may be simultaneously applied.

(4) Relationship Between Configuration of Alpha and Beta Values and a Z Value

The UE may determine the value of alpha used for determining the TB size as follows.

i) The value of Alpha may be indicated from the network through RRC or DCI (e.g., UL grant).

ii) The value of Alpha may be the same as the number of slots to which PUSCH TB is mapped. In this case, the slot to which the PUSCH TB is mapped may mean a transmission occasion. And, as in the <TBoMS configuration method 1>, one TBoMS transmission is performed through one transmission occasion, or as in <TBoMS configuration method 2>, one TBoMS transmission may be performed through a plurality of transmission occasions. In this case, the number of slots to which the PUSCH TB is actually mapped may be different for each TB repetition. For example, in the first TB transmission occasion, the TB is mapped using 4 slots, but in the second TB transmission occasion, 3 slots may be used for TB mapping. Considering this case, the number of slots to which the PUSCH TB is mapped used for TB size determination may mean the following.

a) The number of slots to which the PUSCH TB is mapped may be the same as the number of slots to which the PUSCH TB is mapped (=Z) indicated by the network/donor node. In this case, the value of Z may be indicated in the same way as in 'section A'.

b) The number of slots to which the PUSCH TB is mapped may mean the number of slots used for TB mapping in the first transmission (=0th transmission occasion) constituting PUSCH TB repetition.

c) The number of slots to which the PUSCH TB is mapped may mean the largest value among the number of slots constituting each transmission occasion constituting PUSCH TB repetition.

d) The number of slots to which the PUSCH TB is mapped may mean the smallest value among the number of slots constituting each transmission occasion constituting PUSCH TB repetition.

The UE may determine the value of beta used for determining the TB size as follows.

The value of beta is indicated from the network through RRC or DCI (e.g., UL grant).

i) The value of beta can have positive numbers such as 0.5, 0.75, 1, 1.25, 1.5, etc.

ii) Or the value of beta can have a positive number greater than or equal to 1, such as 1, 1.25, 1.5, 1.75, etc.

iii) Or the value of beta can have a positive number equal to or less than 1, such as 0.25, 0.5, 0.75, 1, etc.

The UE may determine that the value of Z, which is the number of slots to which the PUSCH TB is mapped (=the number of slots constituting a transmission occasion), is equal to alpha. That is, when the alpha value is indicated to the UE, the UE can determine/assume/consider that the corresponding value is the number of slots (=Z) to which the PUSCH TB is mapped.

Hereinafter, symbol resources for multi-slot TB mapping will be described in detail.

On performing multi-slot TB mapping for PUSCH transmission and applying repetition (repetition), it proposes a symbol resource used for PUSCH TB transmission within a transmission occasion of each TB.

(1) A method of applying the same symbol allocation to slots in which TB mapping is performed.

When the PUSCH TB is mapped to Z slot resources, the same symbol allocation may be applied to the Z slots. That is, when the UE maps the PUSCH TB to Z slot resources, the UE maps the PUSCH TB using the same symbol resource between slots. Hereinafter, it is assumed that the symbols of the slot are indexed from 0.

Figure 18:
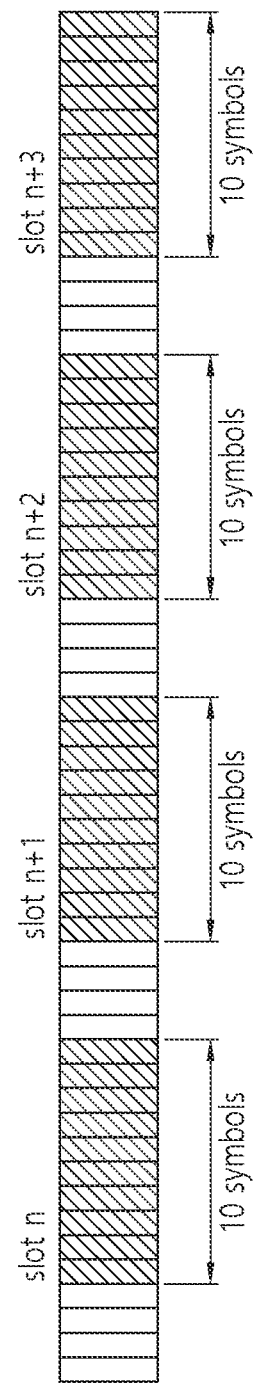
FIG. 18 illustrates an example of inter-slot symbol resource allocation in multi-slot TB mapping.

FIG. 18 is an example of inter-slot symbol resource allocation in multi-slot TB mapping.

Referring to FIG. 18, one PUSCH TB is mapped to slots #n to #n+3. In this case, the UE performs PUSCH TB mapping by using 10 symbol resources from symbols #4 to #13 in each slot equally.

Figure 19:
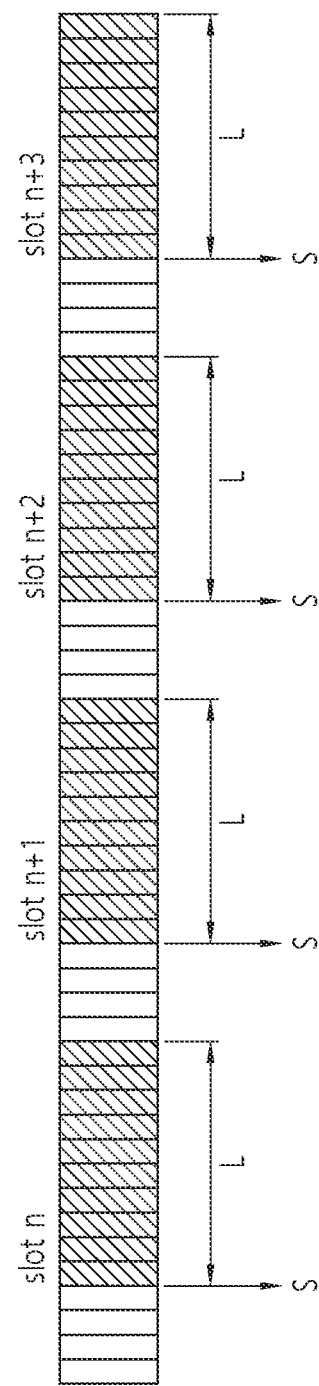
FIG. 19 illustrates another example of inter-slot symbol resource allocation in multi-slot TB mapping.

FIG. 19 is another example of inter-slot symbol resource allocation in multi-slot TB mapping.

Referring to FIG. 19, in order to apply the same symbol allocation to Z slots to which the PUSCH TB is mapped, the following method may be applied. A starting symbol position (i.e., S) and a symbol length (i.e., L) value, at which PUSCH transmission is performed, are indicated independently or in a combined form (S and L values) by a SLIV value, through DCI scheduling PUSCH. In this case, the corresponding S and L values may be equally applied to the Z slot resources. That is, when one PUSCH TB is mapped to slots #n to #n+3 as shown in FIG. 19, symbol resources used for PUSCH TB mapping in each slot are the same as symbols #S to #S+L.

(2) A method of applying mutually independent symbol allocation to slots in which TB mapping is performed.

When the PUSCH TB is mapped to the Z slot resources, different/independent symbol allocation may be applied between the Z slots. That is, when the UE maps the PUSCH TB to the Z slot resources, the UE may map the PUSCH TB using different or independent symbol resources between slots.

Figure 20:
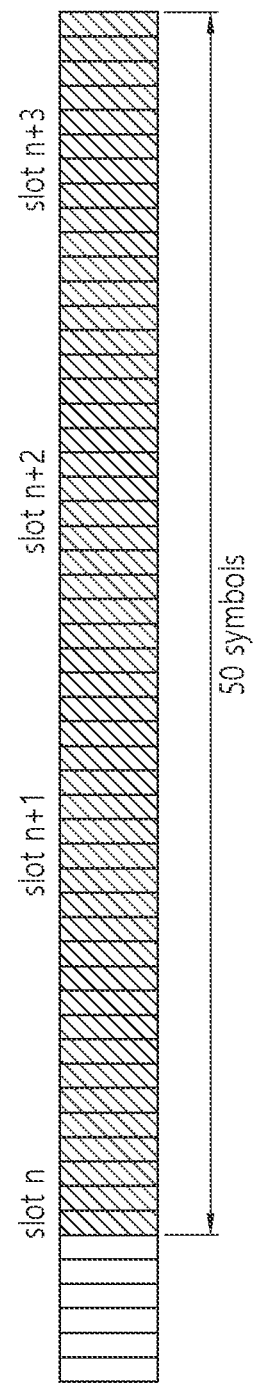
FIG. 20 illustrates still another example of inter-slot symbol resource allocation in multi-slot TB mapping.

FIG. 20 is another example of inter-slot symbol resource allocation in multi-slot TB mapping.

Referring to FIG. 20, one PUSCH TB is mapped to slots #n to #n+3. At this time, the UE performs PUSCH TB mapping using 8 symbol resources from symbols #6 to #13 in slot #n, and using all symbol resources of symbols #0 to #13 in slots #n+1 to #n+3. For such PUSCH TB mapping, the following method may be specifically applied.

A starting symbol position (i.e., S) and a symbol length (i.e., L) value, to which the PUSCH TB is mapped, are indicated independently or in a combined form (S and L values) by a SLIV value, through DCI scheduling PUSCH. In this case, for symbol resources constituting Z slots to which the PUSCH TB is mapped, S and L indicate continuous symbol resources used for PUSCH TB mapping regardless of slot boundaries.

That is, when the symbol resources constituting the Z slots to which the PUSCH TB is mapped are sequentially referred to as symbols #0~#(Z·$N^{slot}_{sym}$−1), among the corresponding symbols, symbols #S to #S+L−1 are used for PUSCH transmission. Here, $N^{slot}_{sym}$ means the number of OFDM symbols constituting one slot. In this case, S may have a value in the range of 0 to Z·$N^{slot}_{sym}$−1, and L may have a value in the range of 1 to Z·$N^{slot}_{sym}$. At this time, the values of S and L should be set to satisfy the condition of S+L<=Z·$N^{slot}_{sym}$.

Figure 21:
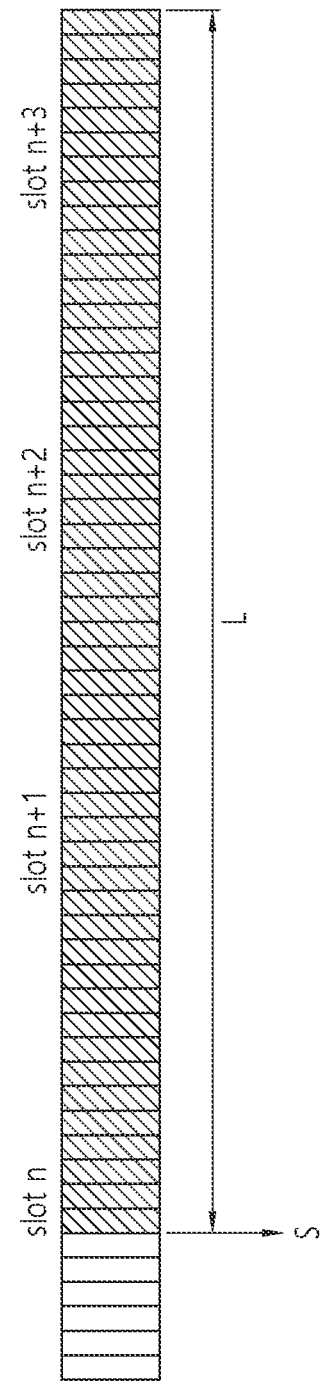
FIG. 21 illustrates still another example of inter-slot symbol resource allocation in multi-slot TB mapping.

FIG. 21 is another example of inter-slot symbol resource allocation in multi-slot TB mapping.

Referring to FIG. 21, one PUSCH TB is mapped to slots #n to #n+3. At this time, when the values of S and L are indicated through DCI for scheduling PUSCH, the UE determines that a total of L symbols from the S-th symbol to the S+L−1 symbol, among 14*4 symbol resources in slots #n to #n+3, are used for PUSCH mapping.

Through DCI scheduling PUSCH, the UE is informed of the value of the start symbol index (i.e., S) in the first slot and/or the last symbol index (i.e., E) in the last slot to which the PUSCH TB is mapped. At this time, among the symbol resources constituting the Z slots to which the PUSCH TB is mapped, the UE determines that symbol resources from symbol #S in the first slot to symbol #E in the last slot are symbol resources used for PUSCH TB mapping. In this case, each of S and E may have a value in the range of 0 to $N^{slot}_{sym}$−1.

That is, among the symbol resources constituting the Z slots to which the PUSCH TB is mapped, symbols #S~#$N^{slot}_{sym}$−1 are used for PUSCH mapping in the first slot, symbol #0 symbol #E is used for PUSCH mapping in the last slot, and all symbols of symbol #0 to symbol #$N^{slot}_{sym}$−1 are used for PUSCH mapping in the remaining slots.

Figure 22:
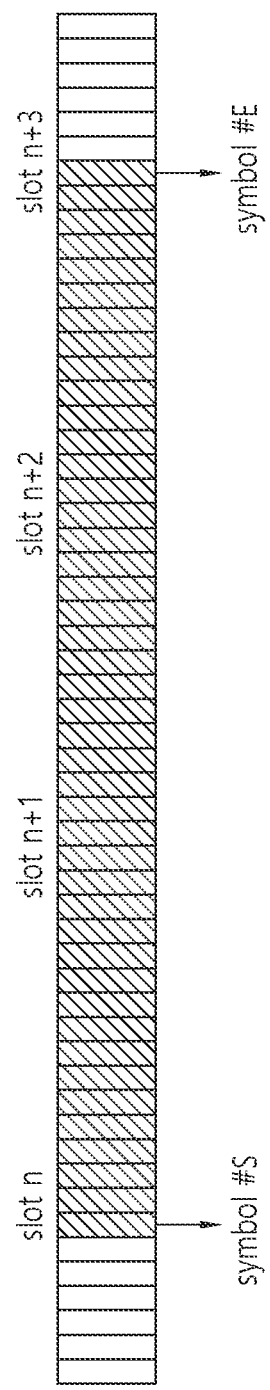
FIG. 22 illustrates still another example of inter-slot symbol resource allocation in multi-slot TB mapping.

FIG. 22 is another example of inter-slot symbol resource allocation in multi-slot TB mapping.

Referring to FIG. 22, one PUSCH TB is mapped to slots #n to #n+3. At this time, when the values of S and E are indicated through DCI for scheduling PUSCH, the UE determines that symbol resources from symbol #S of slot #n to symbol #E of slot #n+3 are used for PUSCH mapping.

In this case, only the S value or the E value may be indicated through DCI. If only the S value is indicated, among the symbol resources constituting the Z slots to which the PUSCH TB is mapped, symbols #S~#$N^{slot}_{sym}$−1 are used for PUSCH mapping in the first slot, and all symbols of symbol #0 to symbol #$N^{slot}_{sym}$−1 may be used for PUSCH mapping in the remaining slots including the last slot.

If only the E value is indicated, among the symbol resources constituting the Z slots to which the PUSCH TB is mapped, symbol #0~symbol #E is used for PUSCH mapping in the last slot, all symbols of symbol #0 to symbol

$N^{slot}_{sym}$-1 may be used for PUSCH mapping in the remaining slots including the first slot.

While multi-slot TB mapping is applied for PUSCH transmission, repetition may be applied for additional coverage enhancement. When PUSCH TB repetition is performed K times, the TB is repeatedly transmitted K times through K transmission occasions.

As such, when performing multi-slot TB mapping for PUSCH transmission and applying repetition, for the slot resources constituting the transmission occasion of each TB, the symbol resource to which the PUSCH TB is mapped can be determined in the same way as the above-mentioned method. In this case, the same symbol allocation may be applied between different transmission occasions. That is, the same location and the same number of symbol resources may be used for PUSCH transmission between different transmission occasions.

<DM-RS Pattern for Multi-Slot TB Mapping>

The DM-RS for PDSCH/PUSCH may be composed of a front load DM-RS and an additional DM-RS.

The transmission time resource location of the front load DM-RS may be determined by the following factors.

i) It may vary depending on whether the mapping type of the data channel (PDSCH mapping type/PUSCH mapping type) is type A or type B (slot-based or non-slot-based), and the mapping type is set through RRC.

ii) In the case of slot-based transmission, the transmission start OFDM symbol position of the front load DM-RS may be the 3rd or 4th OFDM symbol of the data transmission resource, and an indication of whether the transmission start OFDM symbol position is the third OFDM symbol or the fourth OFDM symbol is transmitted through the PBCH.

iii) The front load DM-RS may consist of one or two consecutive OFDM symbols, and whether the number of OFDM symbols is one or two is set through RRC.

There may be two types (Type 1 or Type 2) of mapping types in the transmission OFDM symbol resource of the front load DM-RS, and information for the type to be applied is set to RRC. In the case of type 1, using the technique of F-CDM (CDM in frequency domain), T-CDM (CDM in time domain), and/or FDM, depending on whether the DM-RS symbol length is 1 or 2, 4 or 8 antenna ports are supported, respectively. For Type 2, using the technique of F-CDM, T-CDM, and/or FDM, depending on whether the DM-RS symbol length is 1 or 2, 6 or 12 antenna ports are supported, respectively.

The number of additional DM-RSs is determined among 0, 1, 2, or 3. The maximum number of additional DM-RSs to be transmitted is determined through RRC, and the number of additional DM-RSs actually transmitted within each maximum number of DM-RSs and the transmission OFDM symbol position are determined according to the length of the OFDM symbol through which data is transmitted.

The number of OFDM symbols and the mapping type of each additional DM-RS are determined to be the same as the number of OFDM symbols and the mapping type of the front load DM-RS.

Hereinafter, when symbol allocation is different between slots to which one PUSCH TB is mapped, a DM-RS pattern for PUSCH transmission is proposed.

In case of DM-RS for PUSCH, as described above, it is divided into a front load DM-RS and an additional DM-RS, and the number of additional DM-RSs is determined among 0, 1, 2, or 3.

The reference point of l (l indicates a symbol index in the time domain) and the position $l_0$ of the first DM-RS symbol are dependent on the mapping type. For PUSCH mapping type A, if frequency hopping is deactivated, l is defined relative to the beginning of the slot, and if frequency hopping is activated, l is defined based on the start of each hop. $l_0$ is provided by the higher layer parameter dmrs-TypeA-Position.

For PUSCH mapping type B, l is defined for the start of the scheduled PUSCH resource when frequency hopping is deactivated and l is defined for the start of each hop when frequency hopping is activated. $l_0$ is 0.

The location(s) of the DM-RS symbol is given by $\bar{l}$ and duration $l_d$.

$l_d$ may be a duration between the first OFDM symbol of a slot and the last OFDM symbol of a scheduled PUSCH resource in a slot for PUSCH mapping type A when intra-slot frequency hopping is not used.

Alternatively, $l_d$ may be a duration of a PUSCH resource scheduled for PUSCH mapping type B when intra-slot frequency hopping is not used.

The following table illustrates a PUSCH DM-RS position in a slot for a single symbol DM-RS when intra-slot frequency hopping is deactivated.

TABLE 8

| | DM-RS positions $\bar{l}$ | | | | | | | |
|---|---|---|---|---|---|---|---|---|
| | PUSCH mapping type A dmrs-AdditionalPosition | | | | PUSCH mapping type B dmrs-AdditionalPosition | | | |
| $l_d$ in symbols | pos0 | pos1 | pos2 | pos3 | pos0 | pos1 | pos2 | pos3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

The following table illustrates the position of the PUSCH DM-RS in the slot for the dual symbol DM-RS when intra-slot frequency hopping is deactivated.

TABLE 9

| | DM-RS positions $\bar{l}$ | | | | | | | |
|---|---|---|---|---|---|---|---|---|
| | PUSCH mapping type A dmrs-AdditionalPosition | | | | PUSCH mapping type B dmrs-AdditionalPosition | | | |
| $l_d$ in symbols | pos0 | pos1 | pos2 | pos3 | pos0 | pos1 | pos2 | pos3 |
| <4 | — | — | | | — | — | | |
| 4 | $l_0$ | $l_0$ | | | — | — | | |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0$ | | |
| 8 | $l_0$ | $l_0$ | | | $l_0$ | $l_0, 5$ | | |
| 9 | $l_0$ | $l_0$ | | | $l_0$ | $l_0, 5$ | | |
| 10 | $l_0$ | $l_0, 8$ | | | $l_0$ | $l_0, 7$ | | |
| 11 | $l_0$ | $l_0, 8$ | | | $l_0$ | $l_0, 7$ | | |
| 12 | $l_0$ | $l_0, 8$ | | | $l_0$ | $l_0, 9$ | | |
| 13 | $l_0$ | $l_0, 10$ | | | $l_0$ | $l_0, 9$ | | |
| 14 | $l_0$ | $l_0, 10$ | | | $l_0$ | $l_0, 9$ | | |

When PUSCH TB is mapped using multiple slots, and symbol resources used for PUSCH TB mapping are different between slots, the UE may determine the transmission symbol position of the DM-RS in the slot resource to which the PUSCH TB is mapped and transmit as follows.

Hereinafter, the DM-RS includes a front loaded DM-RS and an additional DM-RS.

Method 1. In each slot to which PUSCH TB is mapped, the position and number of DM-RS transmission symbols are determined based on the 'reference position for 1' and the 'duration $l_d$' in each transmission slot. Therefore, when the symbol resource used for PUSCH TB mapping is different between slots to which PUSCH TB is mapped, the location and number of DM-RSs may be different for each slot.

Method 2. In order to make the transmission position and number of DM-RS transmission symbols the same in each slot to which the PUSCH TB is mapped, the 'reference position for 1' and the 'duration $l_d$' in each slot may be set identically. For this, the values of 'reference position for 1' and' duration $l_d$' may be specifically set as follows.

First, the 'reference position for 1' means the start of each hop when frequency hopping is activated. When frequency hopping is deactivated, it means i) the start OFDM symbol position of the slot or ii) the position of the first OFDM symbol of the PUSCH transmission resource in the first slot to which the PUSCH TB is mapped.

'Duration $l_d$' means a duration between the first OFDM symbol in the first slot to which the PUSCH TB is mapped and the last OFDM symbol of the PUSCH transmission resource. Alternatively, it means a duration of PUSCH transmission resources in the first slot to which the PUSCH TB is mapped. Alternatively, it may be equal to the number of OFDM symbols constituting the slot.

In each slot, if the PUSCH DM-RS transmission symbol is not located within the PUSCH transmission symbol resource, the UE punctures the DM-RS transmission in the corresponding symbol.

FIG. 23 illustrates a transport block (TB) transmission method of a UE according to an embodiment of the present disclosure.

Referring to FIG. 23, the UE determines a transport block size (TBS) of a transport block used for the first PUSCH transmission (S231). The first PUSCH is a PUSCH to which multi-slot TB mapping is applied, and may be a PUSCH scheduled by a UL grant (e.g., DCI format 0_1 or 0_2).

The TBS may be determined based on the number of resource elements (REs) allocated for the first PUSCH (NR).

More specifically, the NR is a value obtained by multiplying all of i) the number of the plurality of slots (Z), ii) a smaller one between a predetermined fixed value (e.g., 156) and the number of resource elements allocated for PUSCH within a physical resource block ($N'_{RE}$) and iii) the number of allocated physical resource blocks for the UE ($n_{PRB}$).

The predetermined fixed value (e.g., 156) may be related to, for example, the maximum value of the number of REs allocated for PUSCH in the PRB of the slot, or the maximum value of the number of REs to which TB (data) can be mapped. The PRB of the slot may include, for example, 12 subcarriers in the frequency domain and 14 OFDM symbols in the time domain, thereby including a total of 12*14=168 REs. For example, since a reference signal (e.g., DMRS) may need to be mapped in addition to TB (data) to the PRB of the slot, and other overhead may occur, all of the 168 REs may not be available for TB (data) mapping. In this sense, the predetermined fixed value (e.g., 156) may be related to the maximum number of REs to which a TB (data) can be mapped in a PRB of a slot, or the maximum value of the number of REs allocated for PUSCH in the PRB. The value 156 may be changed to another value.

That is, the $N_{RE}$ may be determined based on the following equation.

$$N_{RE} = Z \cdot \min(156, N'_{RE}) \cdot n_{PRB} \quad \text{[Equation 7]}$$

Equation 7 is substantially the same as Equation 1 described above. The only difference is that the alpha of Equation 1 is denoted as Z in Equation 7.

Based on the $N_{RE}$ value determined as described above, the value of $N_{info}$ is determined. The $N_{info}$ value may be determined as $N_{info} = N_{RE} \cdot R \cdot Q_m \cdot v$. Here, R denotes a target code rate, $Q_m$ denotes a modulation order, and v denotes the number of layers.

First, if $N_{info}$ is 3824 or less, it is based on the following equation.

$$N'_{info} = \max\left(24, 2^n \cdot \left\lfloor \frac{N_{info}}{2^n} \right\rfloor\right) \text{ where } n = \max(3, \lfloor \log_2(N_{info}) \rfloor - 6) \quad \text{[Equation 8]}$$

$N'_{info}$ is a quantized intermediate number of information bits.

At this time, using the table below to find the closest TBS value that is not less than $N'_{info}$.

TABLE 10

| Index | TBS | Index | TBS | Index | TBS | Index | TBS |
|---|---|---|---|---|---|---|---|
| 1 | 24 | 31 | 336 | 61 | 1288 | 91 | 3624 |
| 2 | 32 | 32 | 352 | 62 | 1320 | 92 | 3752 |
| 3 | 40 | 33 | 368 | 63 | 1352 | 93 | 3824 |
| 4 | 48 | 34 | 384 | 64 | 1416 | | |
| 5 | 56 | 35 | 408 | 65 | 1480 | | |
| 6 | 64 | 36 | 432 | 66 | 1544 | | |
| 7 | 72 | 37 | 456 | 67 | 1608 | | |
| 8 | 80 | 38 | 480 | 68 | 1672 | | |
| 9 | 88 | 39 | 504 | 69 | 1736 | | |
| 10 | 96 | 40 | 528 | 70 | 1800 | | |
| 11 | 104 | 41 | 552 | 71 | 1864 | | |
| 12 | 112 | 42 | 576 | 72 | 1928 | | |
| 13 | 120 | 43 | 608 | 73 | 2024 | | |

TABLE 10-continued

| Index | TBS | Index | TBS | Index | TBS | Index | TBS |
|---|---|---|---|---|---|---|---|
| 14 | 128 | 44 | 640 | 74 | 2088 | | |
| 15 | 136 | 45 | 672 | 75 | 2152 | | |
| 16 | 144 | 46 | 704 | 76 | 2216 | | |
| 17 | 152 | 47 | 736 | 77 | 2280 | | |
| 18 | 160 | 48 | 768 | 78 | 2408 | | |
| 19 | 168 | 49 | 808 | 79 | 2472 | | |
| 20 | 176 | 50 | 848 | 80 | 2536 | | |
| 21 | 184 | 51 | 888 | 81 | 2600 | | |
| 22 | 192 | 52 | 928 | 82 | 2664 | | |
| 23 | 208 | 53 | 984 | 83 | 2728 | | |
| 24 | 224 | 54 | 1032 | 84 | 2792 | | |
| 25 | 240 | 55 | 1064 | 85 | 2856 | | |
| 26 | 256 | 56 | 1128 | 86 | 2976 | | |
| 27 | 272 | 57 | 1160 | 87 | 3104 | | |
| 28 | 288 | 58 | 1192 | 88 | 3240 | | |
| 29 | 304 | 59 | 1224 | 89 | 3368 | | |
| 30 | 320 | 60 | 1256 | 90 | 3496 | | |

Next, if $N_{info}$ is greater than 3824, it is based on the following equation.

$$N'_{info} = \max\left(3840, 2^n \times \text{round}\left(\frac{N_{info} - 24}{2^n}\right)\right) \text{ where } n = \lfloor \log_2(N_{info} - 24) \rfloor - 5 \quad \text{[Equation 9]}$$

and ties in the round function are broken towards the next largest integer.

If, 1) R (target code rate) is 1/4 or less, TBS is determined as below equation.

$$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil \quad \text{[Equation 10]}$$

2) Else, i) If $N_{info}$ is greater than 8424, TBS is determined as below equation.

$$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil \quad \text{[Equation 11]}$$

ii) If $N'_{info}$ is less than or equal to 8424, TBS is determined as below equation.

$$TBS = 8 \cdot \left\lceil \frac{N'_{info} + 24}{8} \right\rceil - 24 \quad \text{[Equation 12]}$$

Equations 8 to 12 are the same formulas as Equations 2 to 6, respectively.

The transport block having the TBS is transmitted through a plurality of slots for a first physical uplink shared channel (PUSCH) (S232).

The transmission of the first PUSCH through the Z slots may be repeated K times. The same symbol allocation may be applied to each of the Z·K slots (obtained by multiplying Z and K related to the repeated transmission of the first PUSCH). That is, in each of the Z·K slots, the same symbol resource (e.g., the same start symbol and the same number (length) of symbols) may be used.

The Z·K slots consist of only available slots. For example, at least one of the symbols to be used for repeated transmission of the first PUSCH in the slot overlaps with a DL symbol indicated by a higher layer configuration (for example, tdd-UL-DL-ConfigurationCommon or tdd-UL-DL-ConfigurationDedicated), or a symbol of an synchronization signal/physical broadcast channel block (SSB) provided by ssb-PositionsInBurst, it can be expressed that the slot is not counted in the number of Z·K slots.

Depending on whether the transport block is transmitted in a plurality of slots or is transmitted in one slot, a formula for determining the number of resource elements ($N_{RE}$) allocated for the first PUSCH, which is used to determine the size of the TBS, is different. That is, when the transport block is transmitted in a plurality of slots, Equation 7 is used, and when the transport block is transmitted in one slot, the following Equation 13 is used.

$$N_{RE} = \min(156, N'_{RE}) \cdot n_{PRB} \quad \text{[Equation 13]}$$

Figure 24:
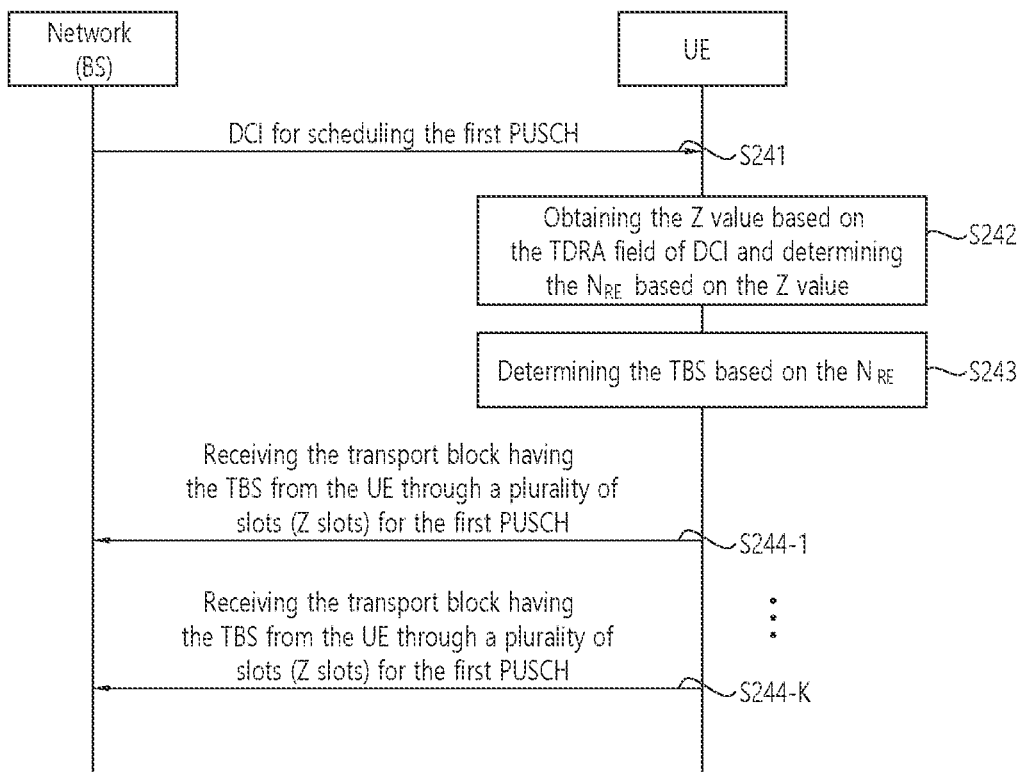
FIG. 24 illustrates a signaling procedure and operation between a user equipment and a network (base station) for applying the method of FIG. 23.

FIG. 24 illustrates a signaling procedure and operation between a UE and a network (base station) for applying the method of FIG. 23.

Referring to FIG. 24, the network (base station) provides downlink control information (DCI) for scheduling the first PUSCH to the UE (via PDCCH) (S241).

The DCI may be, for example, DCI format 0_1 or 0_2. DCI format 0_1 is a DCI used for scheduling one or multiple PUSCHs in one cell or indicating a configured grant downlink feedback information (CG-DFI) to the UE, and DCI format 0_2 may be a DCI used for scheduling PUSCH in one cell.

The DCI may include a time domain resource assignment (TDRA) field. The TDRA field informs of a specific row of a resource allocation table. For example, when the value of the TDRA field is m, it can be interpreted as indicating the row index m+1 of the resource allocation table.

The specific row of the resource allocation table may include information on the Z (that is, the number of slots used for multi-slot TB mapping, which can be expressed as the number of TBoMS slots or the number of slots used for TBS determination). In addition, the specific row may also inform of a slot offset between the DCI and the first PUSCH (K2, K2 may be denoted as K2), a start symbol (S) and an allocation length (L) of the first PUSCH, a mapping type of the first PUSCH, and the number of repetitions (K) to be applied to the first PUSCH transmission.

Table 11 below is an example of a resource allocation table.

TABLE 11

| Row index | PUSCH mapping type | $K_2$ | S | L | Z (the number of slots) | K (the number of repetition) |
|---|---|---|---|---|---|---|
| 1 | Type A | j | 0 | 14 | N1 | M1 |
| 2 | Type A | j | 0 | 12 | N2 | M2 |
| 3 | Type A | j | 0 | 10 | N3 | M3 |
| 4 | Type B | j | 2 | 10 | N4 | M4 |
| 5 | Type B | j | 4 | 10 | N5 | M5 |
| 6 | Type B | j | 4 | 8 | N6 | M6 |
| 7 | Type B | j | 4 | 6 | N7 | M7 |
| 8 | Type A | j + 1 | 0 | 14 | N8 | M8 |
| 9 | Type A | j + 1 | 0 | 12 | N9 | M9 |
| 10 | Type A | j + 1 | 0 | 10 | N10 | M10 |
| 11 | Type A | j + 2 | 0 | 14 | N11 | M11 |
| 12 | Type A | j + 2 | 0 | 12 | N12 | M12 |
| 13 | Type A | j + 2 | 0 | 10 | N13 | M13 |
| 14 | Type B | j | 8 | 6 | N14 | M14 |
| 15 | Type A | j + 3 | 0 | 14 | N15 | M15 |
| 16 | Type A | j + 3 | 0 | 10 | N16 | M16 |

N1 to N16 and M1 to M16 are natural numbers. Table 11 is only an extension of Table 6. Table 11 may be configured to the UE through a higher layer signal (RRC message, system information, MAC message, etc.) by the network, or may be predetermined according to a standard specification.

The UE can know the Z value (that is, the number of slots (Z) of multi-slot TB mapping (TBoMS)) based on the TDRA field value of DCI and the corresponding row of the resource allocation table (of course, in addition to the Z value, the PUSCH mapping type, the slot offset K2, the start symbol (S) in the PUSCH slot, the symbol length/duration (L) of the PUSCH, the number of repetition of transmissions of the PUSCH (K), etc., can be known based on the row of the resource allocation table. However, if K is not in the resource allocation table, it can be interpreted as K=1). The UE determines the NR based on the Z value (S242). The NP may be determined by Equation 7 above.

The UE determines the TBS based on the NR (S243). For example, the TBS may be determined based on Equations 8 to 12 described above.

The UE transmits the transport block having the TBS to the base station through a plurality of slots (Z slots) for the first PUSCH (S244-1). The same symbol allocation is applied to each slot included in the Z slots. For example, a start symbol (S) in a slot of a PUSCH, a symbol length/duration (L) of a PUSCH, etc. are equally applied to each slot included in the Z slots. If PUSCH repeated transmission is set, this process can be repeated K times, and this is expressed as performing S244-1 to S244-K in FIG. 24. The PUSCH is repeatedly transmitted K times may be expressed as transmitting the PUSCH in K transmission occasions (each transmission occasion consists of Z slots) as described with reference to FIG. 11. The same symbol allocation is applied to the Z·K slots related to the repeated transmission. The Z·K slots consist of only available slots.

For example, a slot, in which TBoMS PUSCH transmission cannot be performed because at least one symbol overlapping downlink symbol indicated by higher layer configuration or SSB symbol, etc., occurs, is not included (not counted) in the Z·K slots.

Figure 25:
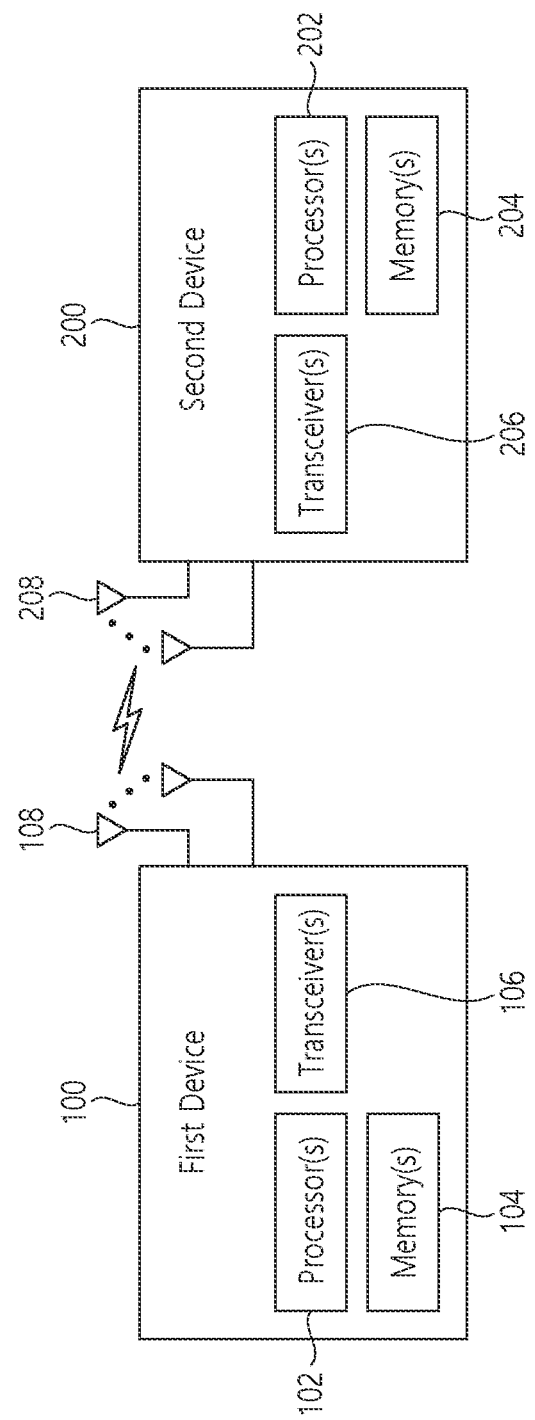
FIG. 25 shows a wireless device which can be applied to the present specification.

FIG. 25 illustrates a wireless device applicable to this specification.

Referring to FIG. 25, the first wireless device 100 and the second wireless device 200 may transmit/receive wireless signals through various wireless access technologies (e.g., LTE, NR).

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In this specification, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In this specification, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The one or more processors 102 and 202 may be implemented as at least one computer readable medium (CRM) including instructions based on being executed by the at least one processor.

For example, each method described in FIGS. 11 to 24 may be performed by at least one computer readable medium (CRM) including instructions based on being executed by at least one processor. The CRM may perform, for example, determining a transport block size (TBS) of the TB and transmitting the TB having the TBS through a plurality of slots for a first physical uplink shared channel (PUSCH). The TBS is determined based on a number of resource elements (REs) allocated for the first PUSCH ($N_{RE}$). The NE is a value obtained by multiplying all of i) a smaller one between a predetermined fixed value and the number of resource elements allocated for PUSCH within a physical resource block ($N'_{RE}$), ii) the number of allocated physical resource blocks for the UE ($n_{PRB}$) and iii) the number of the plurality of slots (Z).

The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 26:
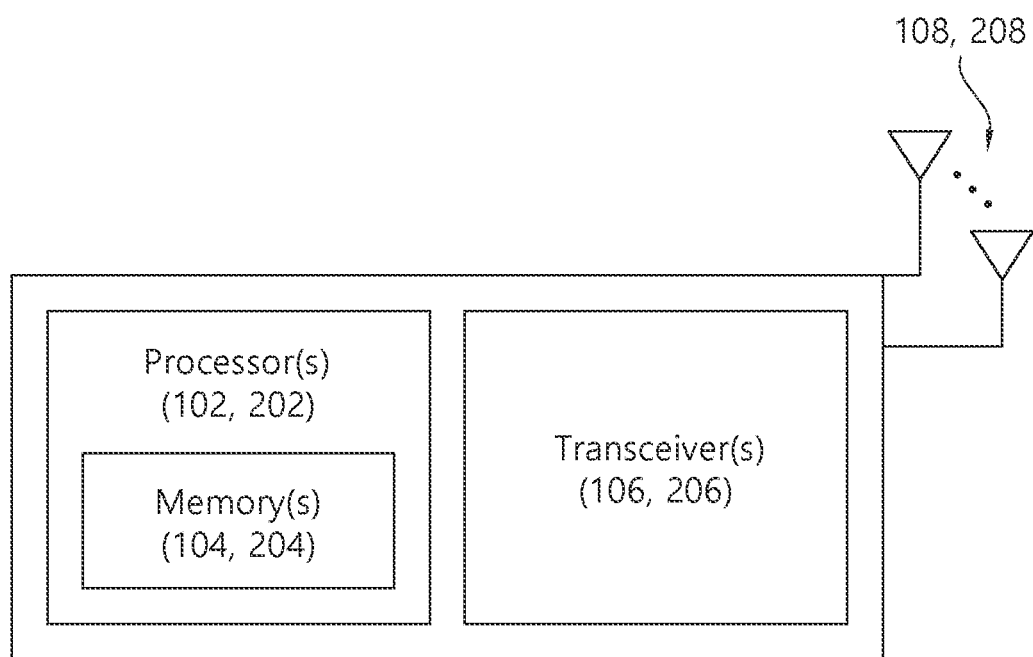
FIG. 26 shows another example of a wireless device.

FIG. 26 shows another example of a wireless device.

Referring to FIG. 26, the wireless device may include at least one processor 102, 202, at least one memory 104, 204, at least one transceiver 106, 206, and one or more antennas 108, 208.

The example of the wireless device described in FIG. 26 is different from the example of the wireless described in FIG. 25 in that the processors 102 and 202 and the memories 104 and 204 are separated in FIG. 25 whereas the memories 104 and 204 are included in the processors 102 and 202 in the example of FIG. 26. That is, the processor and the memory may constitute one chipset.

Figure 27:
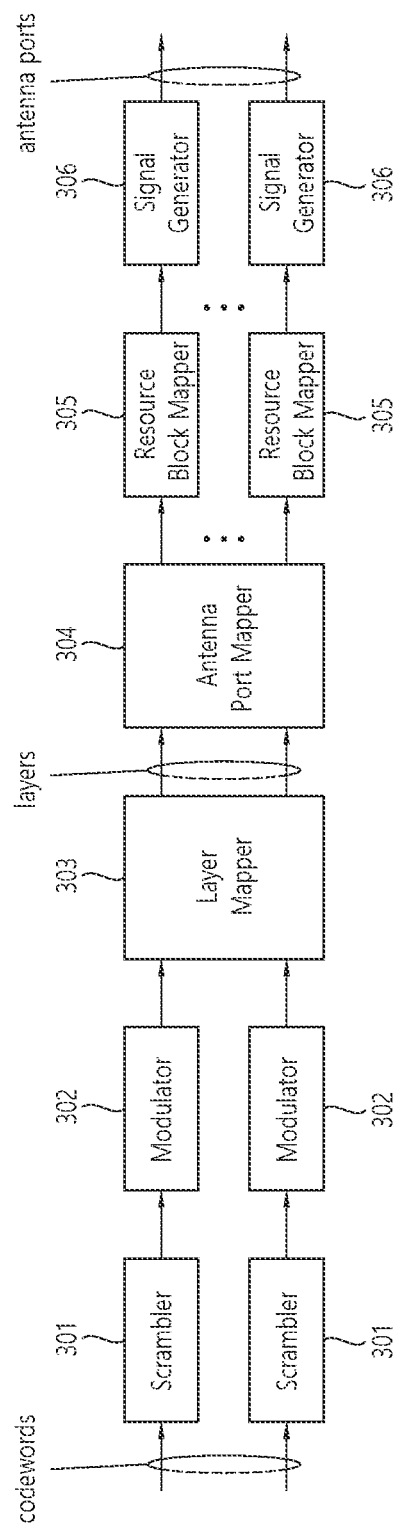
FIG. 27 shows an example of the structure of a signal processing module.

FIG. 27 shows an example of a structure of a signal processing module. Herein, signal processing may be performed in the processors 102 and 202 of FIG. 25.

Referring to FIG. 27, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303.

Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 28:
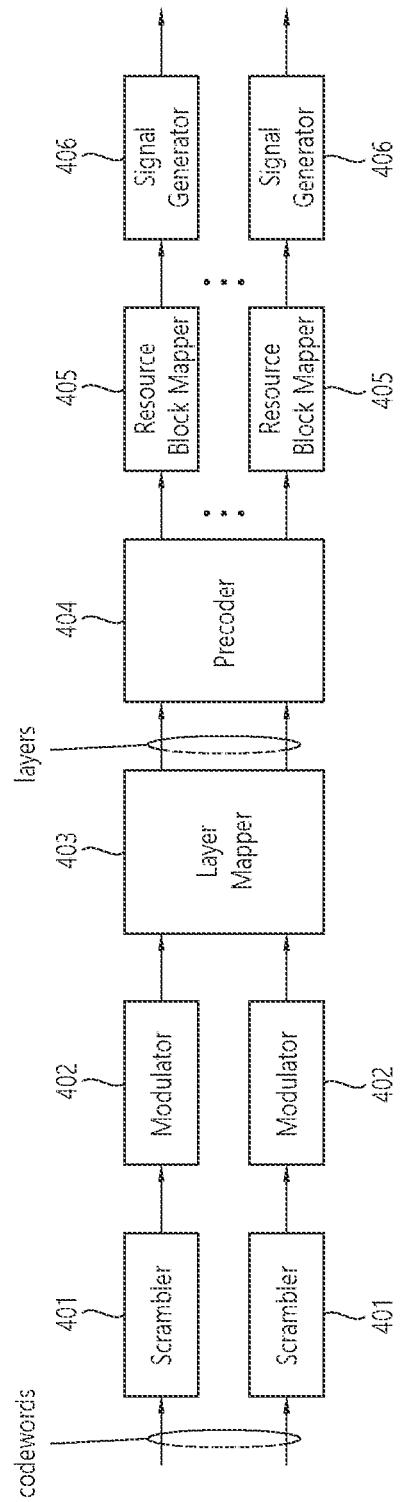
FIG. 28 shows another example of the structure of a signal processing module in a transmission device.

FIG. 28 shows another example of a structure of a signal processing module in a transmitting device. Herein, signal processing may be performed in a processor of a UE/BS, such as the processors 102 and 202 of FIG. 25.

Referring to FIG. 28, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 29:
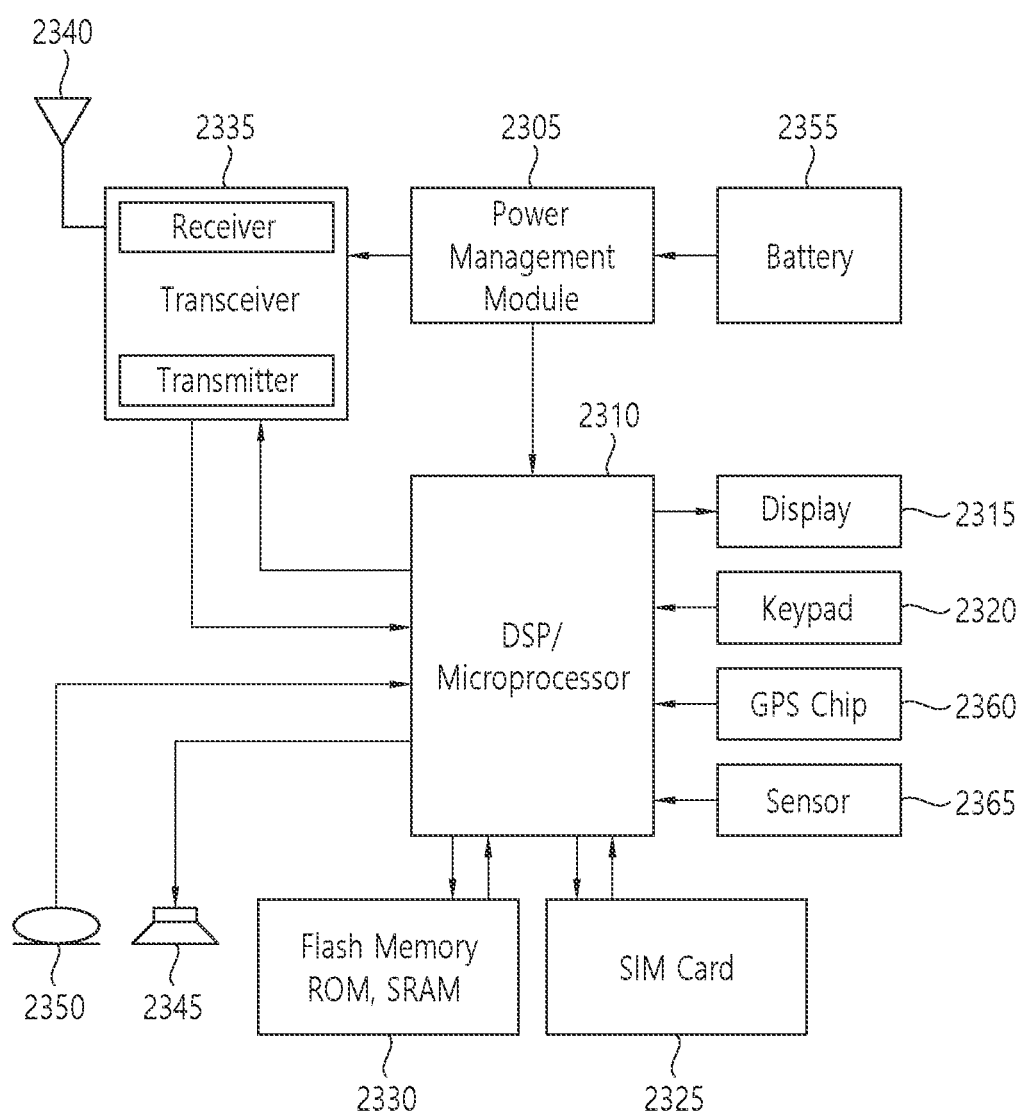
FIG. 29 illustrates an example of a wireless communication device according to an embodiment of the present disclosure.

FIG. 29 illustrates an example of a wireless communication device according to an implementation example of the present disclosure.

Referring to FIG. 29, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 29 may be the processors 102 and 202 in FIG. 25.

The memory 2330 is connected to the processor 2310 and stores information related to operations of the processor. The memory may be located inside or outside the processor and connected to the processor through various techniques such as wired connection and wireless connection. The memory 2330 in FIG. 29 may be the memories 104 and 204 in FIG. 25.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 29 may be the transceivers 106 and 206 in FIG. 25.

Although not shown in FIG. 29, various components such as a camera and a universal serial bus (USB) port may be additionally included in the UE. For example, the camera may be connected to the processor 2310.

FIG. 29 is an example of implementation with respect to the UE and implementation examples of the present disclosure are not limited thereto. The UE need not essentially include all the components shown in FIG. 29. That is, some of the components, for example, the keypad 2320, the GPS chip 2360, the sensor 2365 and the SIM card 2325 may not be essential components. In this case, they may not be included in the UE.

Figure 30:
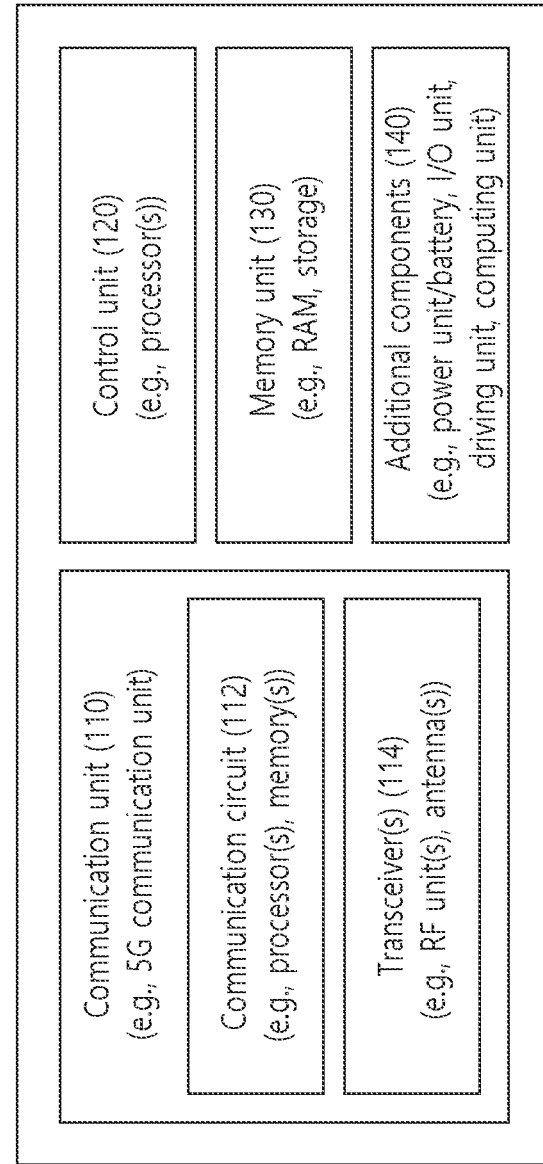
FIG. 30 shows another example of a wireless device applied to the present specification.

FIG. 30 shows another example of a wireless device applied to the present specification. The wireless device may be implemented in various forms according to a use-case/service.

Referring to FIG. 30, wireless devices 100 and 200 may correspond to the wireless devices of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 31), the vehicles (100b-1 and 100b-2 of FIG. 31), the XR device (100c of FIG. 31), the hand-held device (100d of FIG. 31), the home appliance (100e of FIG. 31), the IoT device (100f of FIG. 31), a digital broadcast UE, a hologram device, a public safety device, an MTC device, a medicine device, a fintech device (or a finance device), a security device, a climate/environment device, the AI server/device (400 of FIG. 31), the BSs (200 of FIG. 31), a network node, etc. The wireless device may be used in a mobile or fixed place according to a use-example/service.

In FIG. 30, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 31:
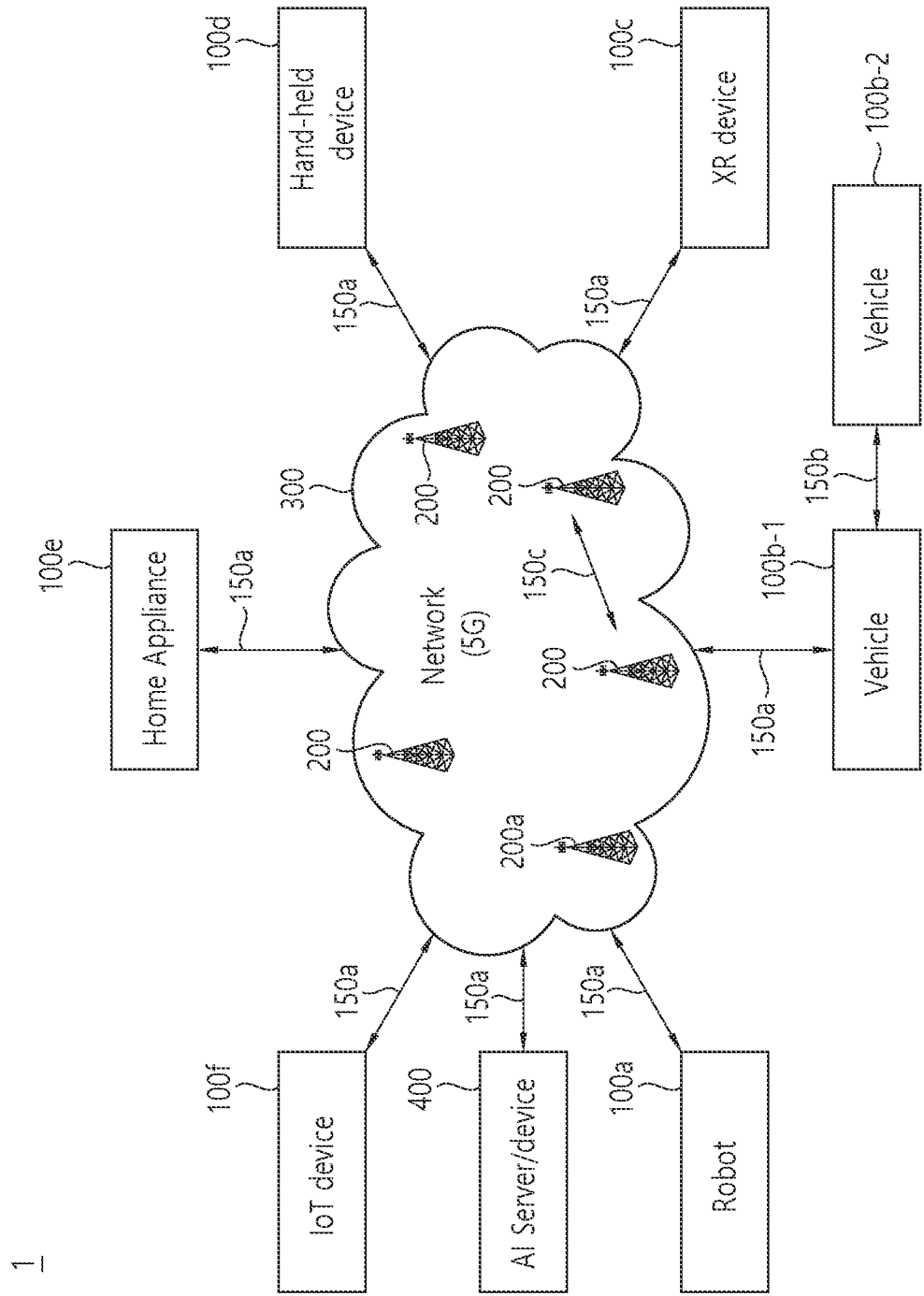
FIG. 31 illustrates the communication system 1 applied to this specification.

FIG. 31 illustrates a communication system 1 applied to the present specification.

Referring to FIG. 31, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/ Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Ve-hicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Here, the wireless communication technology implemented in the wireless devices 100 and 200 of the present specification may include a narrowband Internet of Things for low-power communication as well as LTE, NR, and 6G. At this time, for example, NB-IoT technology may be an example of LPWAN (Low Power Wide Area Network) technology, and it may be implemented in standards such as LTE Cat NB1 and/or LTE Cat NB2, and is not limited to the above-described name. Additionally or alternatively, the wireless communication technology implemented in the wireless devices 100 and 200 of the present specification may perform communication based on the LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100 and 200 of the present specification may include at least one of ZigBee, Bluetooth, and Low Power Wide Area Network (LPWAN) in consideration of low power communication, and is not limited to the above-mentioned names. For example, the ZigBee technology can create PAN (personal area networks) related to small/low-power digital communication based on various standards such as IEEE 802.15.4, and can be called by various names.

NR supports a plurality of numerologies (or a plurality of ranges of subcarrier spacing (SCS)) in order to support a variety of 5G services. For example, when SCS is 15 kHz, a wide area in traditional cellular bands is supported; when SCS is 30 kHz/60 kHz, a dense-urban, lower-latency, and wider-carrier bandwidth is supported; when SCS is 60 kHz or higher, a bandwidth greater than 24.25 GHz is supported to overcome phase noise.

NR frequency bands may be defined as frequency ranges of two types (FR1 and FR2). The values of the frequency ranges may be changed. For example, the frequency ranges of the two types (FR1 and FR2) may be as shown in Table 12. For convenience of description, FR1 of the frequency ranges used for an NR system may refer to a "sub 6 GHz range", and FR2 may refer to an "above 6 GHz range" and may be referred to as a millimeter wave (mmW).

TABLE 12

| Frequency range designation | Corresponding frequency range | Subcarrier spacing |
|---|---|---|
| FR1 | 450 MHz-6000 MHz | 15, 30, 60 kHz |
| FR2 | 24250 MHz-52600 MHz | 60, 120, 240 kHz |

As illustrated above, the values of the frequency ranges for the NR system may be changed. For example, FR1 may include a band from 410 MHz to 7125 MHz as shown in Table 13. That is, FR1 may include a frequency band of 6 GHz (or 5850, 5900, 5925 MHz, or the like) or greater. For example, the frequency band of 6 GHz (or 5850, 5900, 5925 MHz, or the like) or greater included in FR1 may include an unlicensed band. The unlicensed bands may be used for a variety of purposes, for example, for vehicular communication (e.g., autonomous driving).

TABLE 13

| Frequency range designation | Corresponding frequency range | Subcarrier spacing |
|---|---|---|
| FR1 | 410 MHz-7125 MHz | 15, 30, 60 kHz |
| FR2 | 24250 MHz-52600 MHz | 60, 120, 240 kHz |

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method of transmitting a transport block (TB) by a user equipment (UE) in a wireless communication system, the method comprising:

determining a transport block size (TBS) of the TB; and transmitting the TB having the TBS through a plurality of slots for a first physical uplink shared channel (PUSCH), wherein the TBS is determined based on a number of resource elements (REs) allocated for the first PUSCH ($N_{RE}$), wherein the $N_{RE}$ is a value obtained by multiplying all of i) a number of the plurality of slots (Z), ii) a smaller one between a predetermined fixed value and a number of resource elements allocated for PUSCH within a physical resource block ($N'_{RE}$) and iii) a number of allocated physical resource blocks for the UE ($n_{PRB}$), and wherein the $N_{RE}$ is based on a following equation, $$N_{RE} = Z \cdot \min(156, N'_{RE}) \cdot n_{PRB}.$$

2. The method of claim 1, further comprising:

receiving downlink control information (DCI) for scheduling the first PUSCH, wherein a time domain resource assignment (TDRA) field included in the DCI informs of a specific row of a resource assignment table, and wherein the specific row comprises information about the Z.

3. The method of claim 2, wherein the specific row further informs of a slot offset between the DCI and the first PUSCH, a start symbol and allocation length of the first PUSCH, a mapping type of the first PUSCH, and a number of repetitions (K) to be applied to a transmission of the first PUSCH.

4. The method of claim 1, wherein the transmission of the first PUSCH through the Z slots is repeated K times.

5. The method of claim 4, wherein a same symbol allocation is applied to each of a number of slots (Z·K) obtained by multiplying the Z and the K related to repeated transmission of the first PUSCH.

6. The method of claim 5, wherein a slot, in which at least one of symbols to be used for repeated transmission of the first PUSCH overlaps with a downlink symbol indicated by a higher layer configuration or a synchronization signal/physical broadcast channel block (SSB) symbol, is not counted in the number of the Z·K slots.

7. The method of claim 1, wherein depending on whether the transport block is transmitted in a plurality of slots or is transmitted in one slot, a formula for determining the number of resource elements allocated for the first PUSCH ($N_{RE}$), which is used to determine the TBS, is different.

8. A user equipment (UE) comprising:

a transceiver for transmitting and receiving a radio signal; and a processor operating in connected to the transceiver, wherein the processor is configured to:

determine a transport block size (TBS) of the TB; and transmit the TB having the TBS through a plurality of slots for a first physical uplink shared channel (PUSCH), wherein the TBS is determined based on a number of resource elements (REs) allocated for the first PUSCH ($N_{RE}$), wherein the $N_{RE}$ is a value obtained by multiplying all of i) a number of the plurality of slots (Z), ii) a smaller one between a predetermined fixed value and a number of resource elements allocated for PUSCH within a physical resource block ($N'_{RE}$) and iii) a number of allocated physical resource blocks for the UE ($n_{PRB}$), and wherein the $N_{RE}$ is based on a following equation, $$N_{RE} = Z \cdot \min(156, N'_{RE}) \cdot n_{PRB}.$$

9. The UE of claim 8, the processor is further configured to:

receive downlink control information (DCI) for scheduling the first PUSCH, wherein a time domain resource assignment (TDRA) field included in the DCI informs of a specific row of a resource assignment table, and wherein the specific row comprises information about the Z.

10. The UE of claim 9, wherein the specific row further informs of a slot offset between the DCI and the first PUSCH, a start symbol and allocation length of the first PUSCH, a mapping type of the first PUSCH, and a number of repetitions (K) to be applied to a transmission of the first PUSCH.

11. The UE of claim 8, wherein the transmission of the first PUSCH through the Z slots is repeated K times.

12. The UE of claim 11, wherein a same symbol allocation is applied to each of a number of slots (Z·K) obtained by multiplying the Z and the K related to repeated transmission of the first PUSCH.

13. The UE of claim 12, wherein a slot, in which at least one of symbols to be used for repeated transmission of the first PUSCH overlaps with a downlink symbol indicated by a higher layer configuration or a synchronization signal/physical broadcast channel block (SSB) symbol, is not counted in the number of the Z·K slots.

14. The UE of claim 8, wherein depending on whether the transport block is transmitted in a plurality of slots or is transmitted in one slot, a formula for determining the number of resource elements allocated for the first PUSCH ($N_{RE}$), which is used to determine the TBS, is different.

15. A method of receiving a transport block (TB) by a base station (BS) in a wireless communication system, the method comprising:

transmitting downlink control information (DCI) for scheduling a first physical uplink shared channel (PUSCH) to a user equipment (UE); and receiving the transport block having a specific transport block size (TBS) from the UE through a plurality of slots for the first PUSCH, wherein the TBS is determined based on a number of resource elements (REs) allocated for the first PUSCH ($N_{RE}$), wherein the $N_{RE}$ is a value obtained by multiplying all of i) a number of the plurality of slots (Z), ii) a smaller one between a predetermined fixed value and a number of resource elements allocated for PUSCH within a physical resource block ($N'_{RE}$) and iii) a number of allocated physical resource blocks for the UE ($n_{PRB}$), wherein the $N_{RE}$ is based on a following equation, $$N_{RE} = Z \cdot \min(156, N'_{RE}) \cdot n_{PRB},$$

wherein a time domain resource assignment (TDRA) field included in the DCI informs of a specific row of a resource allocation table, and wherein the specific row comprises information for the number of the plurality of slots (Z).

* * * * *